(12) United States Patent
Lee et al.

(10) Patent No.: US 10,877,587 B2
(45) Date of Patent: Dec. 29, 2020

(54) TOUCH SENSOR AND DISPLAY DEVICE INCLUDING THE SAME

(71) Applicant: Samsung Display Co., Ltd., Yongin-si (KR)

(72) Inventors: Hyeon Bum Lee, Yongin-si (KR); Hyoeng Ki Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/527,050

(22) Filed: Jul. 31, 2019

(65) Prior Publication Data

US 2020/0117304 A1    Apr. 16, 2020

(30) Foreign Application Priority Data

Oct. 16, 2018    (KR) .................. 10-2018-0123400

(51) Int. Cl.
| | |
|---|---|
| *G06F 3/041* | (2006.01) |
| *G06F 3/044* | (2006.01) |
| *B32B 15/04* | (2006.01) |
| *B32B 7/02* | (2019.01) |

(52) U.S. Cl.
CPC .......... *G06F 3/0412* (2013.01); *G06F 3/044* (2013.01); *B32B 7/02* (2013.01); *B32B 15/04* (2013.01); *B32B 2457/208* (2013.01); *G06F 2203/04103* (2013.01)

(58) Field of Classification Search
None
See application file for complete search history.

(56) References Cited

U.S. PATENT DOCUMENTS

| | | |
|---|---|---|
| 2015/0220181 A1 | 8/2015 | Jung |
| 2016/0299610 A1 | 10/2016 | Yoon |
| 2017/0344162 A1 | 11/2017 | Lee et al. |

FOREIGN PATENT DOCUMENTS

| | | |
|---|---|---|
| EP | 2905683 | 12/2015 |
| KR | 10-1853027 | 4/2018 |
| KR | 10-2018-0044640 | 5/2018 |

OTHER PUBLICATIONS

European Search Report in EP Application No. 19203704.2 dated Feb. 24, 2020.

*Primary Examiner* — Nicholas J Lee
(74) *Attorney, Agent, or Firm* — H.C. Park & Associates, PLC

(57) ABSTRACT

A touch sensor includes a base layer including a sensing area and a non-sensing area, a plurality of touch electrodes disposed in the sensing area, a dummy electrode disposed between the touch electrodes, the dummy electrode including a plurality of dummy patterns spaced apart from each other, and an insulating layer disposed on the touch electrodes and the dummy electrode, in which the insulating layer includes at least one discontinuous pattern in an area disposed between adjacent dummy patterns.

23 Claims, 16 Drawing Sheets

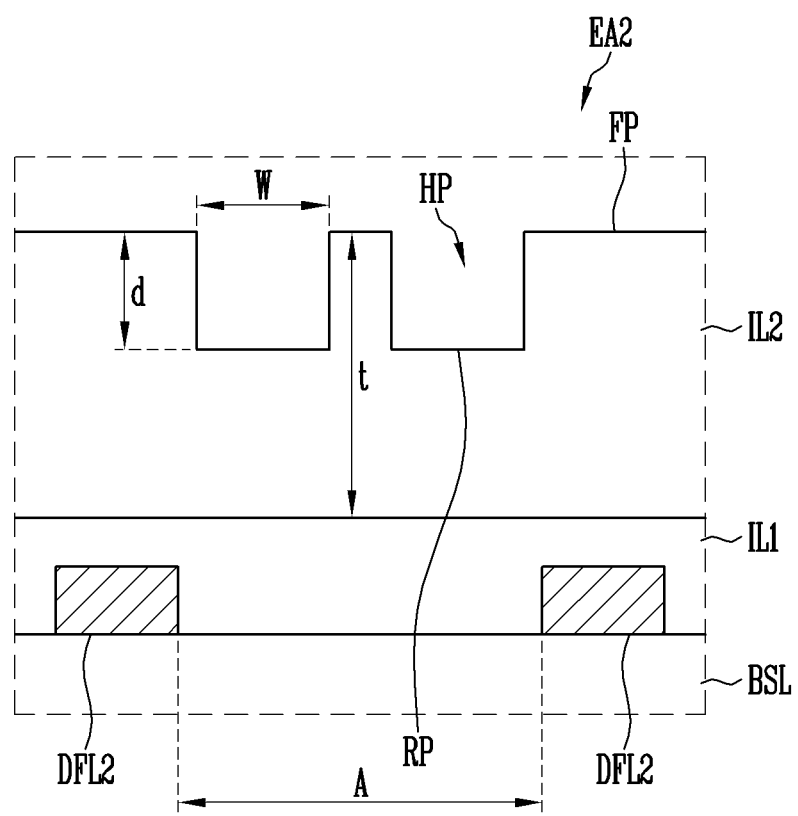

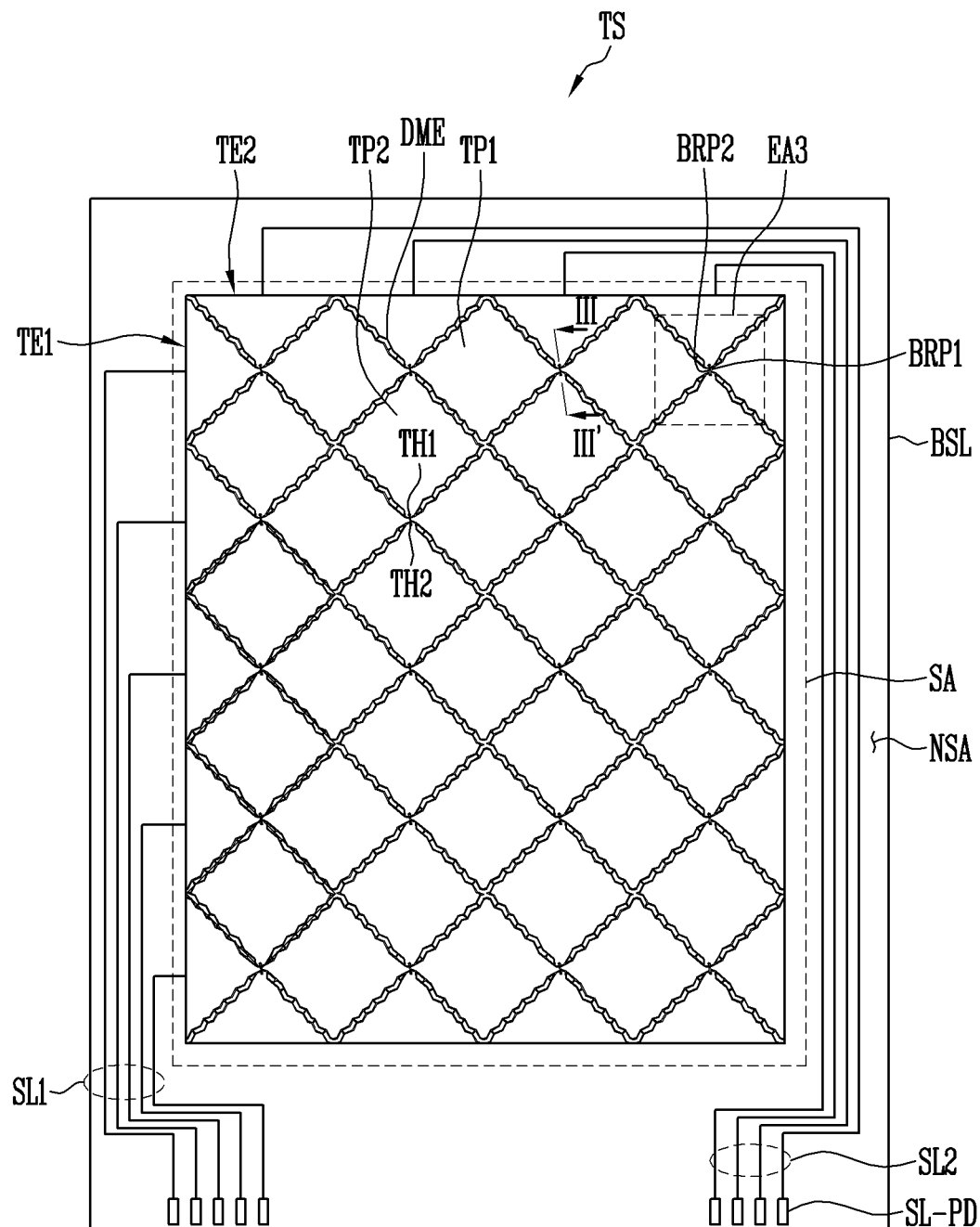

TOUCH SENSOR AND DISPLAY DEVICE INCLUDING THE SAME

CROSS-REFERENCE TO RELATED APPLICATION

This application claims priority from and the benefit of Korean Patent Application No. 10-2018-0123400, filed on Oct. 16, 2018, which is hereby incorporated by reference for all purposes as if fully set forth herein.

BACKGROUND

Field

Exemplary embodiments of the invention relate generally to a touch sensor and, more specifically, to a touch sensor having reduced visibility and a display device including the same.

Discussion of the Background

Recent display devices have been being developed to provide an information input function in addition to providing an image display function. The information input function of display devices may be generally implemented by a touch sensor configured to receive a touch of a user or a predetermined tool.

The touch sensor may be attached to one surface of a display panel that may display an image, or may be integrally formed with the display panel. The user may watch an image displayed on the display panel and press or touch the touch sensor to input information.

The touch sensor may be applied not only to a planar display device but also to a flexible display device, a curved display device, a foldable display device, a bendable display device, etc.

To increase the degree of design freedom of the shape of display devices, the thicknesses of a display panel and a touch sensor may have to be reduced, The above information disclosed in this Background section is only for understanding of the background of the inventive concepts, and, therefore, it may contain information that does not constitute prior art.

SUMMARY

Applicant discovered that reducing the thickness of a display panel and touch sensor can lead to deterioration of touch sensor sensitivity and increased visibility of conductive patterns in the touch sensor by a user due to reflection of external light.

A touch sensor constructed according to exemplary embodiments of the invention and a display device including the same are capable of reducing a conductive pattern from being visible to a user and enhancing reliability of the display device. For example, irregular reflection of external light generated in the areas of the touch sensor, such as those defined between the dummy fine lines, may be removed by destructive interference with external light reflection generated on the touch electrodes.

Additional features of the inventive concepts will be set forth in the description which follows, and in part will be apparent from the description, or may be learned by practice of the inventive concepts.

A touch sensor according to an exemplary embodiment includes a base layer including a sensing area and a non-sensing area, a plurality of touch electrodes disposed in the sensing area, a dummy electrode disposed between the touch electrodes, the dummy electrode including a plurality of dummy patterns spaced apart from each other, and an insulating layer disposed on the touch electrodes and the dummy electrode, in which the insulating layer includes at least one discontinuous pattern in an area disposed between adjacent dummy patterns.

The discontinuous pattern may include an uneven pattern recessed from a first surface of the insulating layer toward the base layer.

The uneven pattern may extend to about half of a thickness of the insulating layer or less from the first surface of the insulating layer.

A width of the uneven pattern may be about equal to or less than a distance between the adjacent dummy patterns.

The dummy electrode may be disposed on a planar surface, and the uneven pattern may be configured to irregularly reflect light incident on a first area between the adjacent dummy patterns.

The insulating layer may be substantially flat in areas other than the area including the uneven pattern.

The touch electrodes may include a first touch electrode including first touch patterns and first bridge patterns coupling the first touch patterns to each other, and a second touch electrode including second touch patterns and second bridge patterns coupling the second touch patterns to each other.

The first touch patterns and the second touch patterns may be disposed on the same layer, and any one of the first bridge patterns and the second bridge patterns are disposed on the same layer as the first touch patterns, and the first bridge patterns and the second bridge patterns intersect with each other with an interlayer insulating layer interposed therebetween.

The interlayer insulating layer may include an organic insulating layer including organic material.

The dummy electrode may be disposed on the same layer as the first and second touch patterns.

Each of the touch electrodes and the dummy electrode may have a substantially mesh shape.

The dummy electrode may include a first dummy fine line extending substantially in a first direction, a plurality of second dummy fine lines extending substantially in a second direction intersecting the first direction, the second dummy fine lines being substantially parallel to each other, and a plurality of dummy mesh openings formed at intersections between the first dummy fine line and the second dummy fine lines.

A touch sensor according to another exemplary embodiment includes a base layer including a sensing area and a non-sensing area, a first touch electrode disposed in the sensing area and substantially extending in a first direction, a second touch electrode including touch patterns spaced apart from each other along a second direction intersecting the first direction and a bridge pattern coupling adjacent touch patterns in the second direction, a first insulating layer interposed between the bridge pattern and the touch patterns, a dummy electrode disposed between the first touch electrode and the touch patterns, the dummy electrode including a plurality of dummy patterns spaced apart from each other, and a second insulating layer disposed on the first touch electrode, the second touch electrode, and the dummy electrode, in which the second insulating layer includes at least one discontinuous pattern in an area disposed between adjacent dummy patterns.

The dummy electrode may be disposed on a planar surface, the discontinuous pattern may include an uneven pattern recessed from a first surface of the second insulating layer toward the base layer, and the uneven pattern may be configured to irregularly reflect light incident on an area between the adjacent dummy patterns.

The dummy electrode may include conductive fine lines intersecting each other and has a substantially mesh shape.

A display device according to an exemplary embodiment includes a display panel configured to display an image, and a touch sensor disposed on the display panel, and including a base layer disposed on the display panel, and including a sensing area and a non-sensing area, a plurality of touch electrodes disposed in the sensing area, a dummy electrode disposed between the touch electrodes and including a plurality of dummy patterns spaced apart from each other, and an insulating layer disposed on the touch electrodes and the dummy electrode, and including at least one discontinuous pattern in an area disposed between adjacent dummy patterns.

A plurality of discontinuous patterns may be formed in the area between the adjacent dummy patterns.

The discontinuous pattern may not overlap the dummy patterns.

The dummy electrode may be disposed on a planar surface, and the discontinuous pattern may include an uneven pattern configured to irregularly reflect light incident on an area between the adjacent dummy patterns to cause destructive interference with light reflected by the touch electrodes.

The dummy electrode may have a substantially a mesh shape and may be electrically floated.

The dummy electrode may be disposed on the same layer as the first and second touch patterns.

The touch electrodes and the dummy electrode may each have a mesh shape.

The dummy electrode may include a first dummy fine line extending substantially in a first direction, a plurality of second dummy fine lines extending substantially in a second direction intersecting the first direction, the plurality of second dummy fine lines being generally parallel to each other, and a plurality of dummy mesh openings formed by intersecting the first dummy fine line and the second dummy fine lines with each other.

The display panel may include a substrate including a display area to display the image, and a non-display area provided on at least one side of the display area, a pixel circuit layer disposed on the substrate, and including at least one transistor, a display element layer disposed on the pixel circuit layer, and including at least one light emitting element to emit light, and an encapsulation layer disposed on the display element layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIGS. 11B and 11C are cross-sectional views the second insulating layer of FIG. 11A according to exemplary embodiments.

FIG. 12 is a schematic plan view of the touch sensor of FIG. 1.

DETAILED DESCRIPTION

Figure 1:
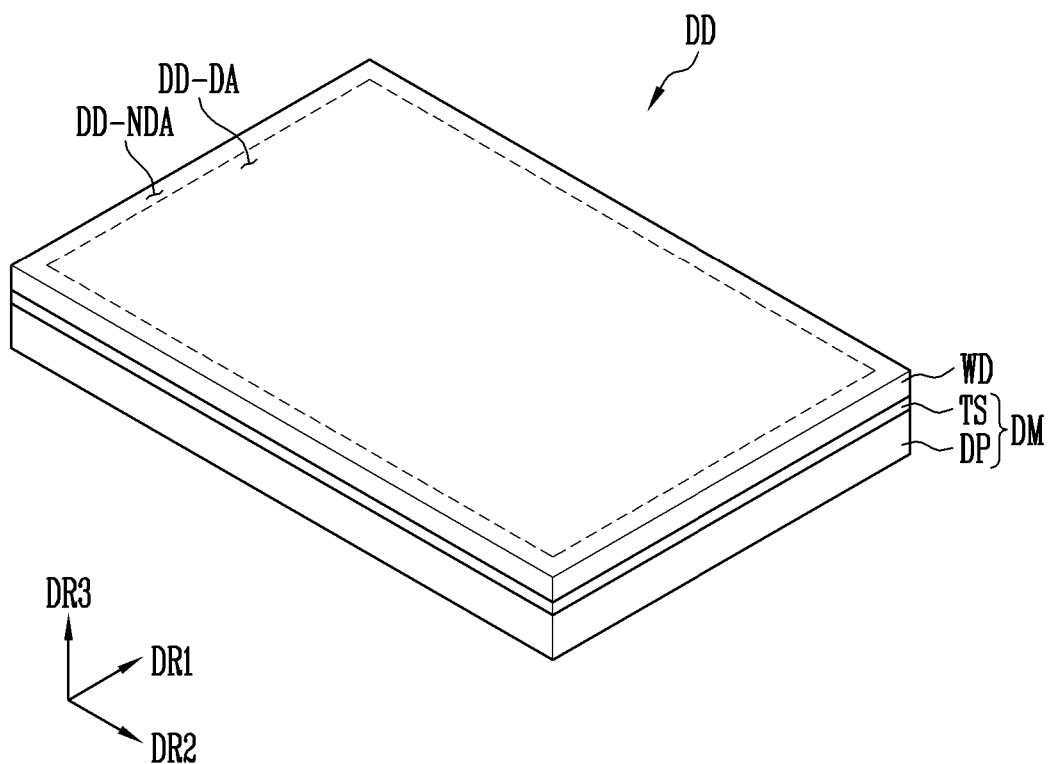
FIG. 1 is a perspective view of a display device constructed according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
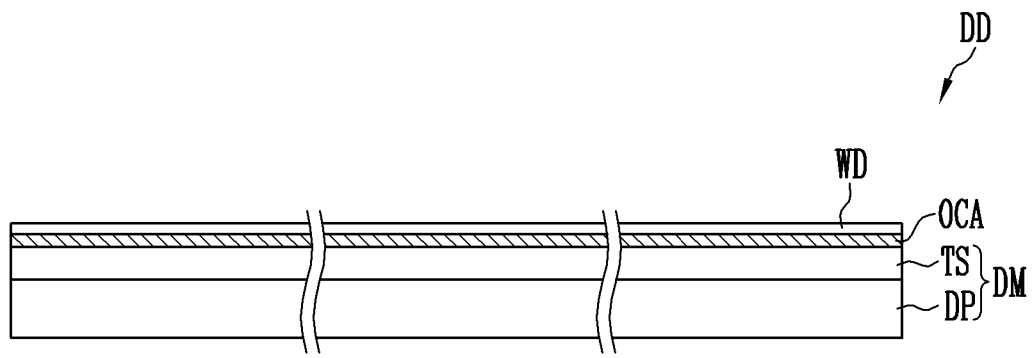
FIG. 2 is a schematic cross-sectional view of the display device of FIG. 1.

FIG. 1 is a perspective view of a display device DD according to an exemplary embodiment, and FIG. 2 is a schematic cross-sectional view of the display device DD of FIG. 1.

Referring to FIGS. 1 and 2, the display device DD according to an exemplary embodiment may include a display module DM and a window WD.

The display device DD may be formed to have various shapes, for example, a substantially rectangular shape having two pairs of generally parallel sides. When the display device DD has a substantially rectangular shape, one pair of sides of the two pairs of sides may be longer than the other. As used herein, display device DD will be described as having a substantially rectangular shape with a pair of long sides and a pair of short sides. The direction in which the long sides extend refers to a first direction DR1, the direction in which the short sides extend refers to a second direction DR2, and the direction perpendicular to the long sides and the short sides refers to a third direction DR3.

At least a portion of the display device DD may be flexible, and the display device DD may be folded along the flexible portion. As used herein, the term "fold" may refer to a display device can change from its original shape o another shape without being fixed thereto, and may also refer to being "folded" or "curved" along at least one specific line, e.g., a folding line, or "rolled" in a scroll manner.

The display device DD may include a display area DD_DA for displaying an image, and a non-display area DD_NDA provided on at least one side of the display area DD_DA. The non-display area DD_NDA may be an area on which an image is not displayed.

The display module DM may include a display panel DP and a touch sensor TS. The touch sensor TS may be directly disposed on the display panel DP. As used herein, the term "directly disposed" may refer to that components are formed through a continuous process except that one of the components adheres to another component by using a separate adhesive layer. In some exemplary embodiments, another layer, such as an adhesive layer or a substrate, may be interposed between the display panel DP and the touch sensor TS.

The display panel DP may display arbitrary visual information, e.g., a text, a video, a photograph, and a two- or three-dimensional image. Hereinafter, the arbitrary visual information will be described as an "image". The inventive concepts are not limited to a particular type of display panel so long as it can display an image. For example, a spontaneous emission display panel such as an organic light emitting display (OLED) panel may be used as the display panel DP. In addition, a non-emissive display panel such as a liquid crystal display (LCD) panel, an electrophoretic display (EPD) panel, or an electrowetting display (EWD) panel may be used as the display panel DP. When the non-emissive display panel is used as the display panel DP, the display device DD may include a backlight unit to supply light to the display panel DP.

The touch sensor TS may be disposed on an image display surface of the display panel DP, and may receive a touch input of the user. The touch sensor TS may recognize a touch event of the display device DD from the hand of the user or a separate input means. The touch sensor TS may recognize a touch event in a capacitive manner according to an exemplary embodiment.

The window WD may be provided on the display module DM to protect an exposed surface of the display module DM. The window WD may protect the display module DM from external impact, and provide an input surface and/or a display surface to the user. The window WD may be coupled with the display module DM by an optical transparent adhesive OCA, for example.

The window WD may have a multi-layer structure including at least one of a glass substrate, a plastic film, and a plastic substrate. The multi-layer structure may be formed through a continuous process or an adhesion process using an adhesive layer. The window WD may entirely or partially have flexibility.

Figure 3:
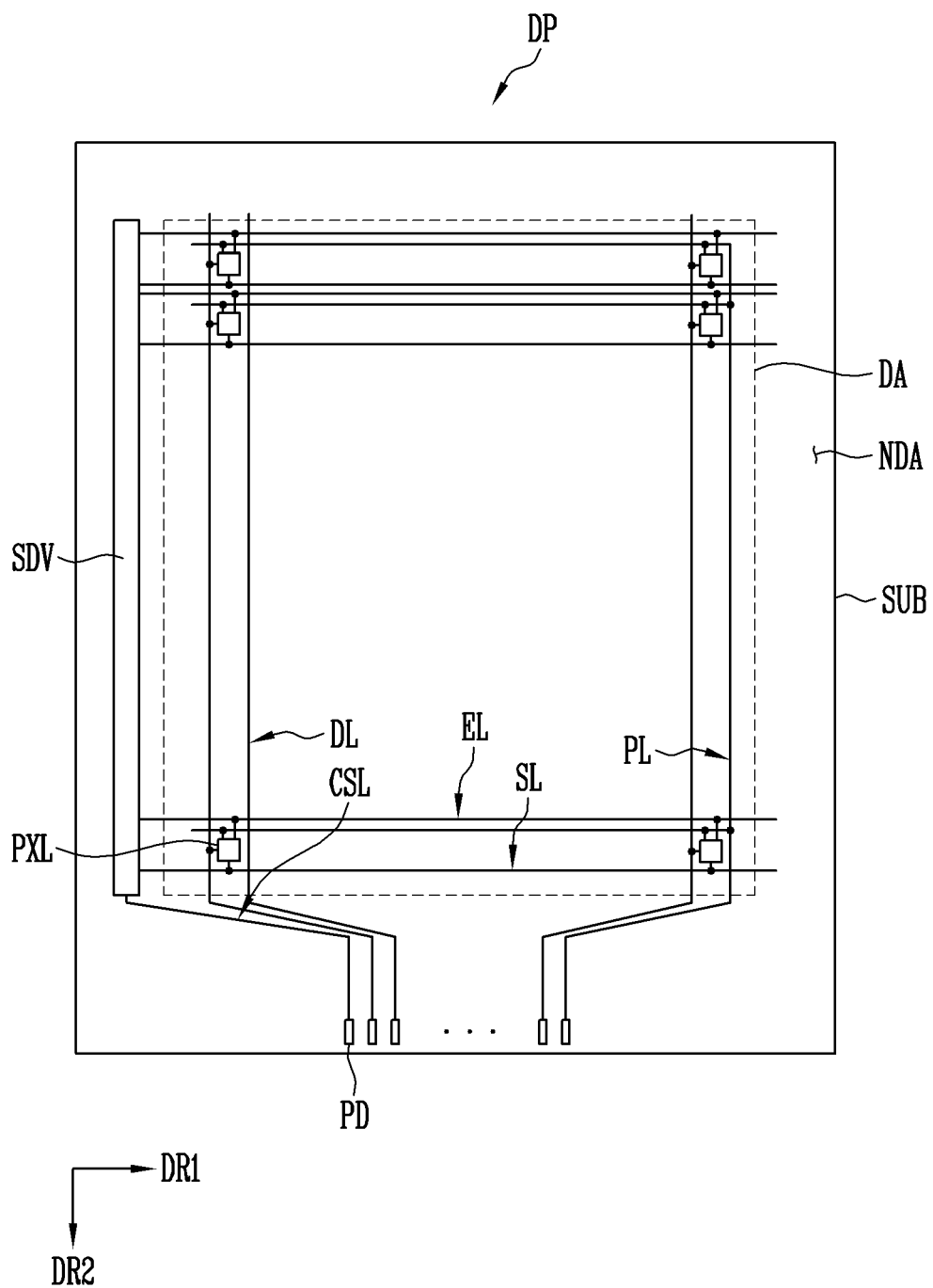
FIG. 3 is a schematic plan view of the display panel of FIG. 1.
Figure 4:
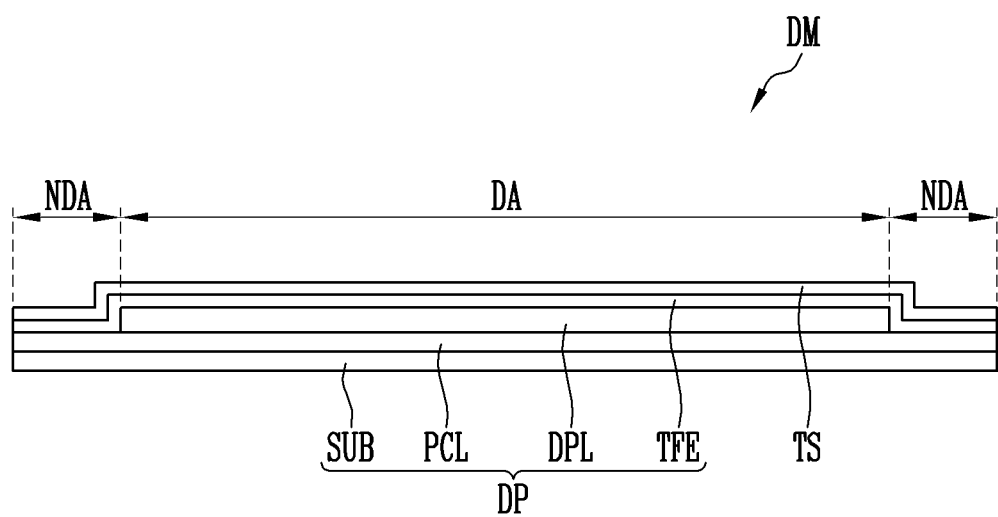
FIG. 4 is a schematic cross-sectional view of the display module of FIG. 2.

FIG. 3 is a schematic plan view of the display panel DP of FIG. 1 according to an exemplary embodiment. FIG. 4 is a schematic cross-sectional view of the display module DM of FIG. 2.

Referring to FIGS. 1 to 4, a display module DM according to an exemplary embodiment may include a display panel DP and a touch sensor TS disposed on the display panel DP.

The display panel DP may include a display area DA and a non-display area NDA. The display area DA and the non-display area NDA of the display panel DP may respectively correspond to the display area DD_DA and the non-display area DD_NDA of the display device DD. In other words, the display area DA of the display panel DP may correspond to the display area DD_DA of the display device DD. The non-display area NDA of the display panel DP may correspond to the non-display area DD_NDA of the display device DD. In an exemplary embodiment, the display area DA and the non-display area NDA of the display panel DP may or may not be equal to the display area DD_DA and the non-display area DD_NDA of the display device DD, respectively. For example, the display area DA and the non-display area NDA of the display panel DP may be changed depending on the structure and/or design of the display panel DP.

The display panel DP may include a driving circuit SDV, a plurality of signal lines, a plurality of pixels PXL, and a plurality of pads PD.

An area in which the pixels PXL are disposed may be defined as the display area DA. In an exemplary embodiment, the non-display area NDA may be defined along the periphery of the display area DA. Each pixel PXL may include a light emitting element and a pixel driving circuit coupled to the light emitting element.

The driving circuit SDV may include a scan driving circuit. Hereinafter, the driving circuit SDV may also be referred to as the scan driving circuit SDV. The scan driving circuit SDV may generate a plurality of scan signals and sequentially output the scan signals to a plurality of scan lines SL, which will be described below. The scan driving circuit SDV may further output another control signal to the pixel driving circuit of each pixel PXL. The scan driving circuit SDV may include at least one or more transistors that may be formed through substantially the same process for forming the pixel driving circuits of the pixels PXL, e.g., through a low temperature polycrystalline silicon (LTPS) process or a low temperature polycrystalline oxide (LTPO) process.

The signal lines may include scan lines SL, data lines DL, emission control lines EL, control signal lines CSL, and power lines PL. The scan lines SL may be coupled to corresponding ones of the pixels PXL, and the data lines DL may be coupled to corresponding ones of the pixels PXL. Each of the emission control lines EL may be disposed substantially parallel to a corresponding one of the scan lines SL. The control signal lines CSL may transmit control signals to the scan driving circuit SDV and overlap with the display area DA and the non-display area NDA. The power lines PL may be coupled to the pixels PXL and transmit a first power supply voltage to the corresponding pixels PXL.

The pads PD may be disposed in the non-display area NDA and coupled to first ends of the data lines DL, the control signal lines CSL, and the power lines PL.

As shown in FIG. 4, the display panel DP may include a substrate SUB, a pixel circuit layer PCL disposed on the substrate SUB, a display element layer DPL disposed on the pixel circuit layer PCL and electrically connected to the pixel circuit layer PCL, and a thin film encapsulation layer TFE disposed on the display element layer DPL.

The substrate SUB may include an insulating material, such as glass or resin. Furthermore, the substrate SUB may include a material having flexibility so as to be bendable or foldable, and have a single- or multi-layer structure. For example, examples of the material having flexibility may include at least one of the following: polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material of the substrate SUB may be changed in various ways, and the substrate SUB may also be made of fiber glass reinforced plastic (FRP) or the like. As such, the substrate SUB according to an exemplary embodiment may include a flexible material.

The pixel circuit layer PCL may include a plurality of insulating layers, a plurality of conductive layers, and a semiconductor layer. The plurality of conductive layers of the pixel circuit layer PCL may form signal lines or a pixel driving circuit.

The display element layer DPL may include a light emitting element configured to emit light.

The thin film encapsulation layer TFE may seal the display element layer DPL. The thin film encapsulation layer TFE may have a single layer or a multi-layer structure. The thin film encapsulation layer TFE may include a plurality of insulating layers covering the light emitting element. In particular, the thin film encapsulation layer TFE may include at least one inorganic layer and at least one organic layer. For example, the thin film encapsulation layer TFE may be formed by alternately stacking the inorganic layers and the organic layers. In some exemplary embodiments, the thin film encapsulation layer TFE may be an encapsulation substrate, which is disposed on the display element layer DPL and joined to the substrate SUB by a sealant.

The touch sensor TS may include a plurality of touch electrodes and a plurality of sensing lines. Each of the touch electrodes and the sensing lines may have a single- or multi-layer structure.

The touch electrodes and the sensing lines may include indium tin oxide (ITO), indium zinc oxide (IZO), zinc oxide (ZnO), indium tin zinc oxide (ITZO), PEDOT, metal nanowires, and/or graphene. The touch electrodes and the sensing lines may include a metal layer made of, e.g., molybdenum, silver, titanium, copper, aluminum, or an alloy thereof. The touch electrodes and the sensing lines may have an identical layer structure or different layer structures. Detailed contents of the touch sensor TS will be described below with reference to FIG. 8.

Figure 5:
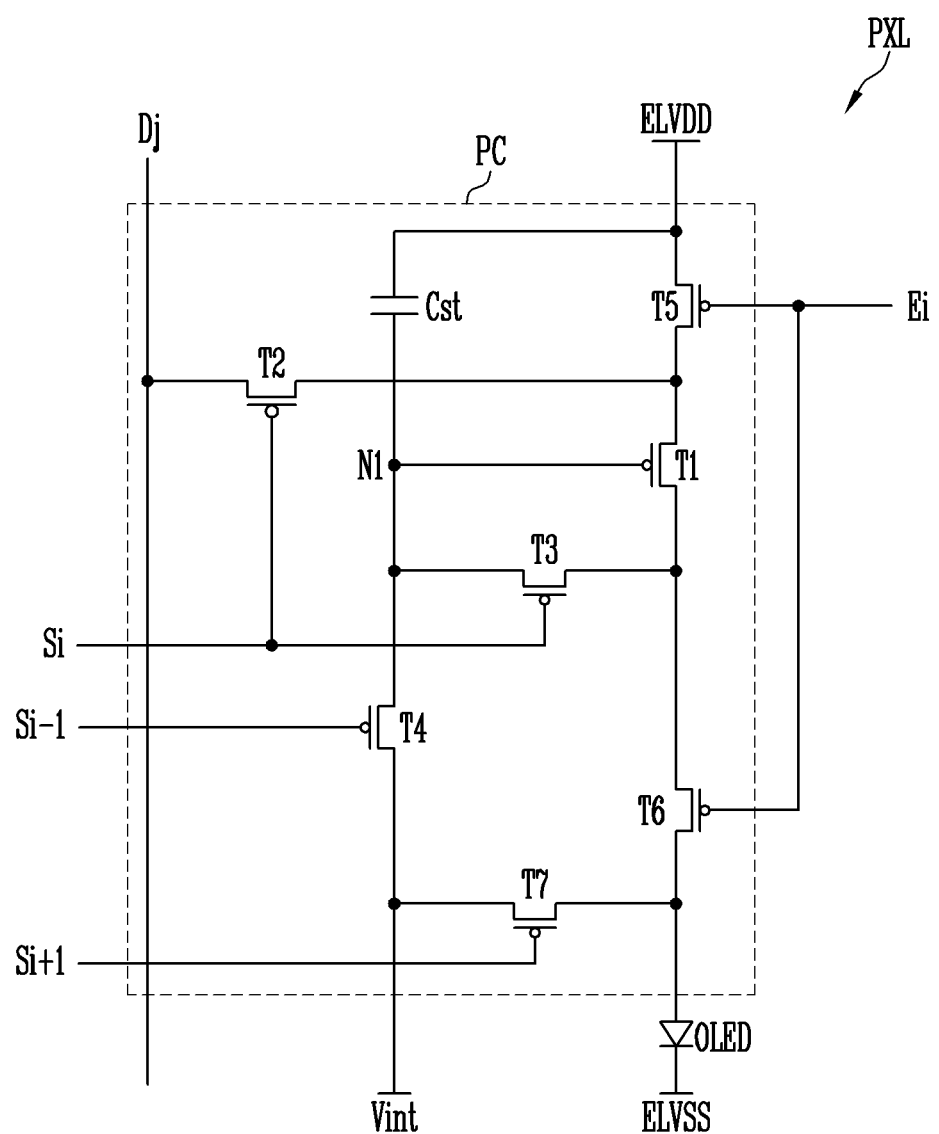
FIG. 5 is an equivalent circuit diagram of a representative pixel shown of FIG. 3.

FIG. 5 is an equivalent circuit diagram of a representative pixel PXL of FIG. 3 according to an exemplary embodiment.

FIG. 5 illustrates one pixel PXL disposed on an $i^{th}$ row and a $j^{th}$ column, and coupled to a $j^{th}$ data line Dj, an $i-1^{th}$ scan line Si−1, an $i^{th}$ scan line Si, and an $i+1^{th}$ scan line Si+1, according to an exemplary embodiment.

Referring to FIGS. 1 to 5, the pixel PXL according to an exemplary embodiment may include a light emitting element OLED, and a pixel driving circuit PC coupled to the light emitting element OLED and configured to drive the light emitting element OLED. The pixel driving circuit PC may include first to seventh transistors T1 to T7, and a storage capacitor Cst.

An anode electrode of the light emitting element OLED may be coupled to the first transistor T1 via the sixth transistor T6. A cathode electrode of the light emitting element OLED may be coupled to a second power supply ELVSS.

The light emitting element OLED may emit light having a predetermined luminance corresponding to current supplied from the first transistor T1. The voltage of a first power supply ELVDD to be applied to the power line PL may be set to a voltage higher than that of the second power supply ELVSS to allow current to flow to the light emitting element OLED.

A source electrode of the first transistor T1 (driving transistor) may be coupled to the first power supply ELVDD via the fifth transistor T5, and a drain electrode thereof may be coupled to the anode electrode of the light emitting element OLED via the sixth transistor T6. The first transistor T1 may control the current flowing from the first power supply ELVDD to the second power supply ELVSS via the light emitting element OLED in response to the voltage of the first node N1 connected to a gate electrode thereof.

The second transistor T2 (switching transistor) is coupled between the $j^{th}$ data line Dj and the source electrode of the first transistor T1. A gate electrode of the second transistor T2 is coupled to the $i^{th}$ scan line Si. When a scan signal is supplied to the $i^{th}$ scan line Si, the second transistor T2 may be turned on to electrically connect the $j^{th}$ data line Dj to the source electrode of the first transistor T1.

The third transistor T3 is coupled between the drain electrode of the first transistor T1 and the first node N1. A gate electrode of the third transistor T3 is coupled to the $i^{th}$ scan line Si. When a scan signal is supplied to the $i^{th}$ scan line Si, the third transistor T3 may be turned on to electrically connect the drain electrode of the first transistor T1 to the first node N1. Therefore, when the third transistor T3 is turned on, the first transistor T1 may be connected in the form of a diode.

The fourth transistor T4 may be coupled between the first node N1 and an initialization power supply Vint. A gate electrode of the fourth transistor T4 may be coupled to the $i-1^{th}$ scan line Si−1. When a scan signal is supplied to the $i-1^{th}$ scan line Si−1, the fourth transistor T4 is turned on to supply the voltage of the initialization power supply Vint to the first node N1. The initialization power supply Vint may be set to a voltage lower than that of a data signal.

The fifth transistor T5 may be coupled between the first power supply ELVDD and the source electrode of the first transistor T1. A gate electrode of the fifth transistor T5 may be coupled to the $i^{th}$ emission control line Ei. The fifth transistor T5 may be turned off when an emission control signal is supplied to the $i^{th}$ emission control line Ei, and may be turned on otherwise.

The sixth transistor T6 may be coupled between the drain electrode of the first transistor T1 and the anode electrode of the light emitting element OLED. A gate electrode of the sixth transistor T6 may be coupled to the $i^{th}$ emission control line Ei. The sixth transistor T6 may be turned off when an emission control signal is supplied to the $i^{th}$ emission control line Ei, and may be turned on otherwise.

The seventh transistor T7 may be coupled between the initialization power supply Vint and the anode electrode of the light emitting device OLED. A gate electrode of the seventh transistor T7 is coupled to the $i+i^{th}$ scan line Si+1. When a scan signal is supplied to the $i+1^{th}$ scan line Si+1, the seventh transistor T7 is turned on to supply the voltage of the initialization power supply Vint to the anode electrode of the light emitting element OLED.

The storage capacitor Cst may be coupled between the first power supply ELVDD and the first node N1. The storage capacitor Cst may store a voltage corresponding to a data signal and a threshold voltage of the first transistor T1.

Figure 6:
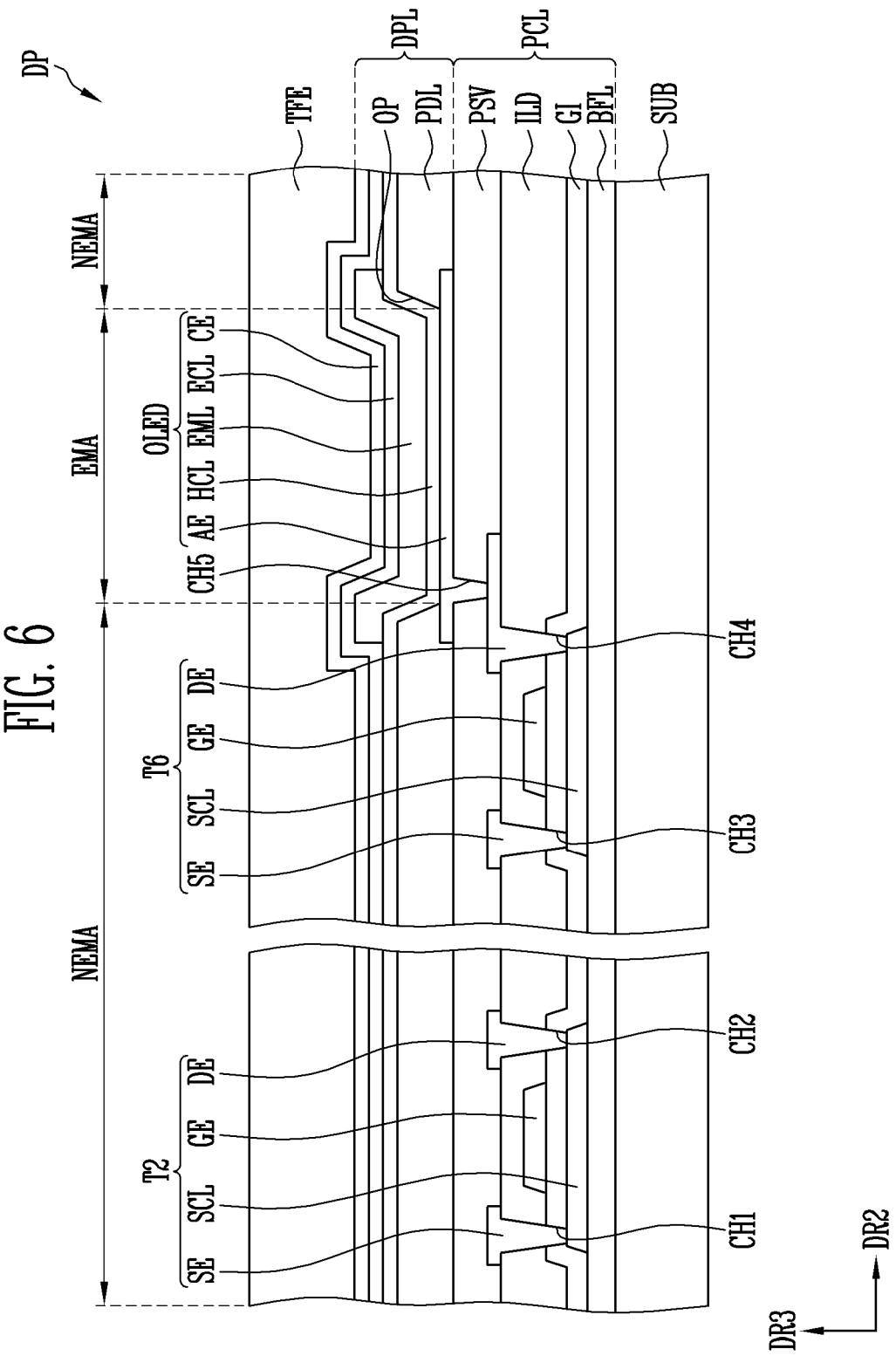
FIG. 6 is an enlarged cross-sectional view of the display panel of FIG. 3.

FIG. 6 is an enlarged cross-sectional view of the display panel DP of FIG. 3 according to an exemplary embodiment.

In FIG. 6, exemplarily illustrates cross sections of portions corresponding to only the second and sixth transistors among the first to seventh transistors shown in FIG. 5.

Referring to FIGS. 1 to 6, the display panel DP according to an exemplary embodiment may include a substrate SUB, a pixel circuit layer PCL, a display element layer DPL, and a thin film encapsulation layer TFE.

The substrate SUB may include an insulating material such as glass, an organic polymer, or crystal. Furthermore, the substrate SUB may include a material having flexibility so as to be bendable or foldable, and have a single- or multi-layer structure.

The pixel circuit layer PCL may include a buffer layer BFL, second and sixth transistors T2 and T6, and a passivation layer PSV.

The buffer layer BFL may be provided on the substrate SUB and prevent impurities from diffusing into the second or sixth transistor T2 or T6. The buffer layer BFL may be provided in a single-layer structure or a multi-layer structure having at least two or more layers. In some exemplary embodiments, the buffer layer BFL may be omitted depending on the material of the substrate SUB or processing conditions.

Each of the second and sixth transistors T2 and T6 may include a semiconductor layer SCL, a gate electrode GE, a source electrode SE, and a drain electrode DE.

The semiconductor layer SCL of each of the second and sixth transistors T2 and T6 may be disposed on the buffer layer BFL. The semiconductor layer SCL may include first and second areas contacting the source electrode SE and the drain electrode DE, respectively. An area between the first area and the second area may be a channel area. In an exemplary embodiment, the first area may be any one of a source area and a drain area, and the second area may be the other one of the source area and the drain area.

The semiconductor layer SCL may be a semiconductor pattern formed of polysilicon, amorphous silicon, an oxide semiconductor, etc. The channel area may be an intrinsic semiconductor pattern undoped with impurities. Each of the first and second areas may be a semiconductor pattern doped with impurities, such as n-type impurities, p-type impurities, or other metals.

The gate electrode GE of each of the second and sixth transistors T2 and T6 may be disposed on the semiconductor layer SCL with a gate insulating layer GI interposed therebetween.

The source electrode SE of each of the second and sixth transistors T2 and T6 may make contact with any one of the first area and the second area of the corresponding semiconductor layer SCL through a contact hole passing through an interlayer insulating layer ILD and the gate insulating layer GI. For example, the source electrode SE of the second transistor T2 may be in contact with the first area of the corresponding semiconductor layer SCL through a first contact hole CH1 passing through the interlayer insulating layer ILD and the gate insulating layer GI. The source electrode SE of the sixth transistor T6 may be in contact with the first area of the corresponding semiconductor SCL through a third contact hole CH3 passing through the interlayer insulating layer ILD and the gate insulating layer GI.

The drain electrode DE of each of the second and sixth transistors T2 and T6 may be in contact with the other one of the first area and the second area of the corresponding semiconductor layer SCL through a contact hole passing through the interlayer insulating layer ILD and the gate insulating layer GI. For example, the drain electrode DE of the second transistor T2 may be in contact with the second area of the corresponding semiconductor layer SCL through a second contact hole CH2 passing through the interlayer insulating layer ILD and the gate insulating layer GI. The drain electrode DE of the sixth transistor T6 may be in contact with the second area of the corresponding semiconductor SCL through a fourth contact hole CH4 passing through the interlayer insulating layer ILD and the gate insulating layer GI.

In an exemplary embodiment, each of the interlayer insulating layer ILD and the gate insulating layer GI may be formed of an inorganic insulating layer including inorganic material, or an organic insulating layer including organic material.

The passivation layer PSV may be provided on the second and sixth transistors T2 and T6 to cover the second and sixth transistors T2 and T6. The passivation layer PSV may include a fifth contact hole CH5 through which a portion of the drain electrode DE of the sixth transistor T6 is exposed.

The display element layer DPL may include a light emitting element OLED disposed on the passivation layer PSV to emit light.

The light emitting element OLED may include first and second electrodes AE and CE, and an emission layer EML disposed between the two electrodes AE and CE. Any one of the first and second electrodes AE and CE may be an anode electrode, and the other one may be a cathode electrode. For example, the first electrode AE may be an anode electrode, and the second electrode CE may be a cathode electrode. When the light emitting element OLED is to formed as a top-emission type organic light-emitting diode, the first electrode AE may be a reflective electrode, and the second electrode CE may be a transmissive electrode. According to the illustrated exemplary embodiment, the light emitting element OLED is a top-emission type organic light-emitting diode and the first electrode AE is an anode electrode.

The first electrode AE may be electrically coupled to the drain electrode DE of the sixth transistor T6 through the fifth contact hole CH5 passing through the passivation layer PSV. The first electrode AE may include a reflective layer which may reflect light, and a transparent conductive layer disposed on or under the reflective layer. At least one of the transparent conductive layer and the reflective layer may be electrically coupled to the drain electrode DE of the sixth transistor T6.

The display element layer DPL may further include a pixel define layer PDL having an opening OP, which exposes a portion of the first electrode AE, e.g., an upper surface of the first electrode AE.

Each of the pixels PXL disposed on the display panel DP may be disposed in a pixel area on a planar surface of the display panel DP. In an exemplary embodiment, the pixel area may include an emission area EMA and a non-emission area NEMA provided adjacent to the emission area EMA. The non-emission area NEMA may enclose the emission area EMA. The emission area EMA may be defined to correspond to the portion of the first electrode AE that is exposed through the opening OP.

The display element layer DPL may include a hole control layer HCL and an electron control layer ECL.

The hole control layer HCL may be disposed in common in the emission area EMA and the non-emission area NEMA. The hole control layer HCL may be formed in common in the plurality of pixels PXL as a common layer.

The emission layer EML may be disposed on the hole control layer HCL. The emission layer EML may be disposed in an area corresponding to the opening OP. In particular, the emission layer EML may be separately provided for each of the plurality of pixels PXL. The emission layer EML may include organic material and/or inorganic material. FIG. 6 shows that the emission layer EML is patterned to correspond to a pixel, however, the inventive concepts are not limited thereto. For example, the emission layer EML may be provided in common for the pixels PXL. The color of light generated from the emission layer EML may be one of red, green, blue and white, but the inventive concepts are not limited thereto. For example, the color of light generated from the emission layer EML may be one of magenta, cyan, and yellow.

An electron control layer ECL may be disposed on the emission layer EML. The electron control layer ECL may be provided in common for the pixels PXL and may o inject and/or transport electrons to the emission layer EML.

The second electrode CE may be disposed on the electron control layer ECL. The second electrode CE may be provided in common for the pixels PXL.

The thin film encapsulation layer TFE may be disposed on the second electrode CE to cover the second electrode CE.

The thin film encapsulation layer TFE may be have a single layer, or a multi-layer structure. The thin film encapsulation layer TFE may include a plurality of insulating layers covering the light emitting element OLED. In particular, the thin film encapsulation layer TFE may include at least one inorganic layer and at least one organic layer. For example, the thin film encapsulation layer TFE may be formed by alternately stacking the inorganic layers and the organic layers. In some exemplary embodiments, the thin film encapsulation layer TFE may be an encapsulation substrate which is disposed on the light emitting element OLED and joined to the substrate SUB by a sealant.

Figure 7:
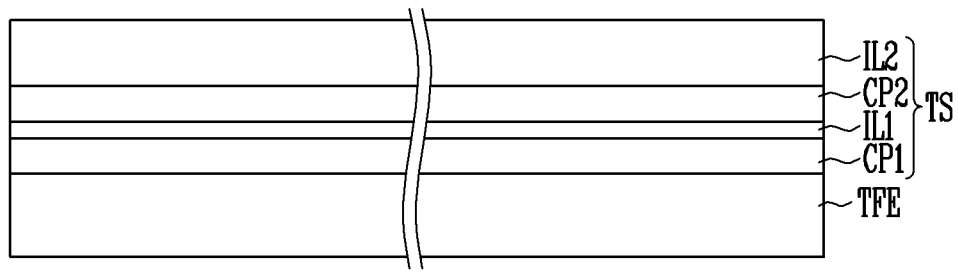
FIG. 7 is a schematic cross-sectional view of the touch sensor of FIG. 1.

FIG. 7 is a schematic cross-sectional view of the touch sensor TS of FIG. 1 according to an exemplary embodiment.

Referring to FIGS. 1 to 7, the touch sensor TS according to an exemplary embodiment may include a first conductive pattern CP1, a first insulating layer IL1, a second conductive pattern CP2, and a second insulating layer IL2.

The first conductive pattern CP1 may be directly disposed on the thin film encapsulation layer TFE of the display panel DP, but the inventive concepts are not limited thereto. In an exemplary embodiment, another inorganic insulating layer may be disposed between the first conductive pattern CP1 and the thin film encapsulation layer TFE. In this case, the first conductive pattern CP1 may be directly disposed on the inorganic insulating layer.

Each of the first and second conductive patterns CP1 and CP2 may have a single-layer structure or a multi-layer structure in which a plurality of layers are stacked in a thickness direction. A conductive pattern having a single-layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), or indium tin zinc oxide (ITZO). In addition, the transparent conductive layer may include PEDOT, metal nanowires, or graphene.

A conductive pattern having a multi-layer structure may include multiple metal layers. The multiple metal layers may form a three-layer structure having a titanium/aluminum/titanium layer structure, for example. In some exemplary embodiments, the conductive pattern having a multi-layer structure may include a single metal layer and a transparent conductive layer. In some exemplary embodiments, the conductive pattern having a multi-layer structure may include multiple metal layers and a transparent conductive layer.

In an exemplary embodiment, each of the first and second conductive patterns CP1 and CP2 may include touch electrodes and sensing lines.

Each of the first and second insulating layers IL1 and IL2 may include an inorganic insulating layer including inorganic material, or an organic insulating layer including organic material. The inorganic insulating layer may include at least one of aluminum oxide, titanium oxide, silicon oxide, silicon nitride, silicon oxynitride, zirconium oxide, and hafnium oxide. The organic insulating layer may include at least one of acrylic resin, methacrylic resin, polyisoprene, vinyl-based resin, epoxy-based resin, urethane-based resin, cellulose-based resin, siloxane-based resin, polyimide-based resin, polyamide-based resin, and perylene-based resin.

Figure 8:
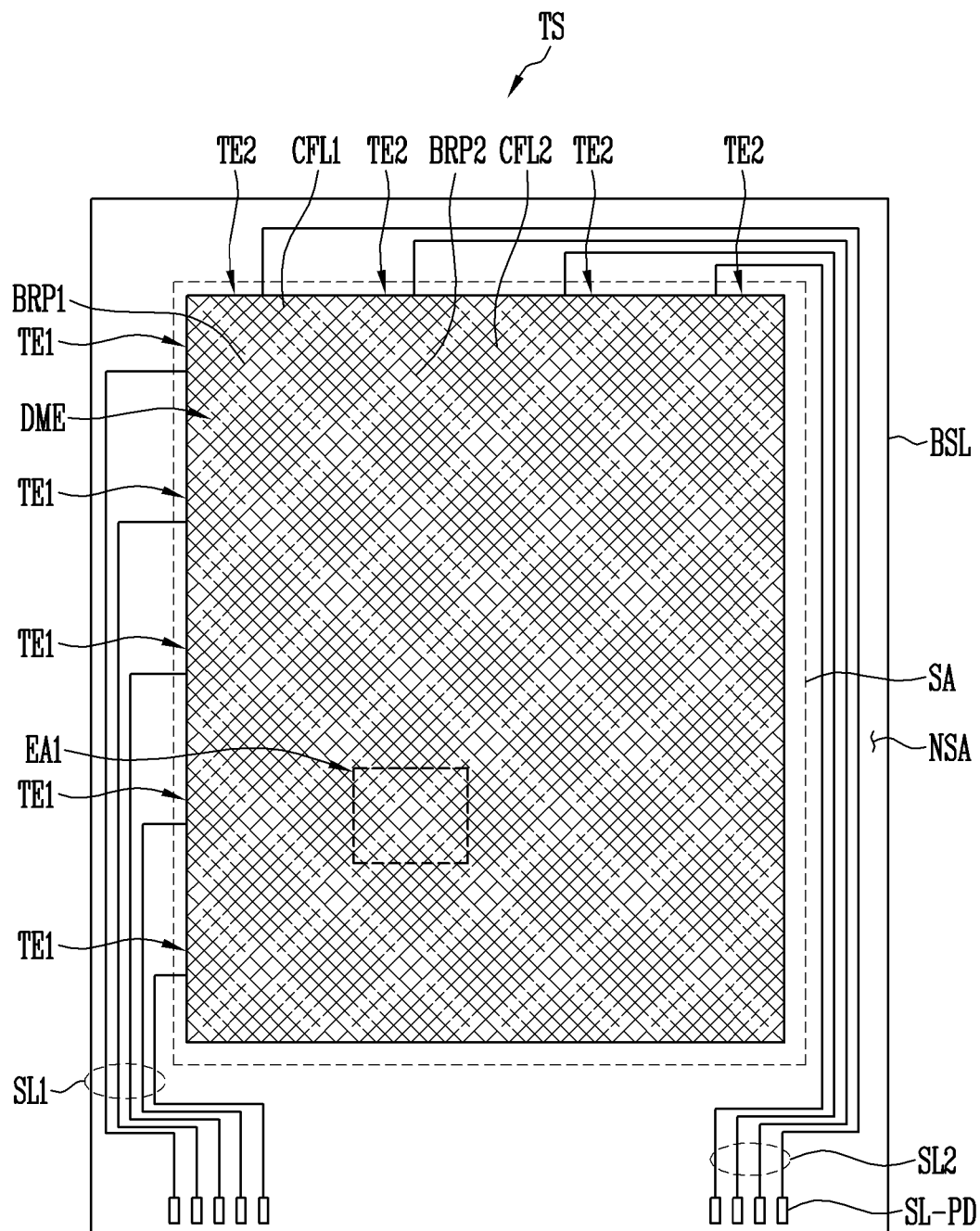
FIG. 8 is a schematic plan view of the touch sensor of FIG. 1.
Figure 9:
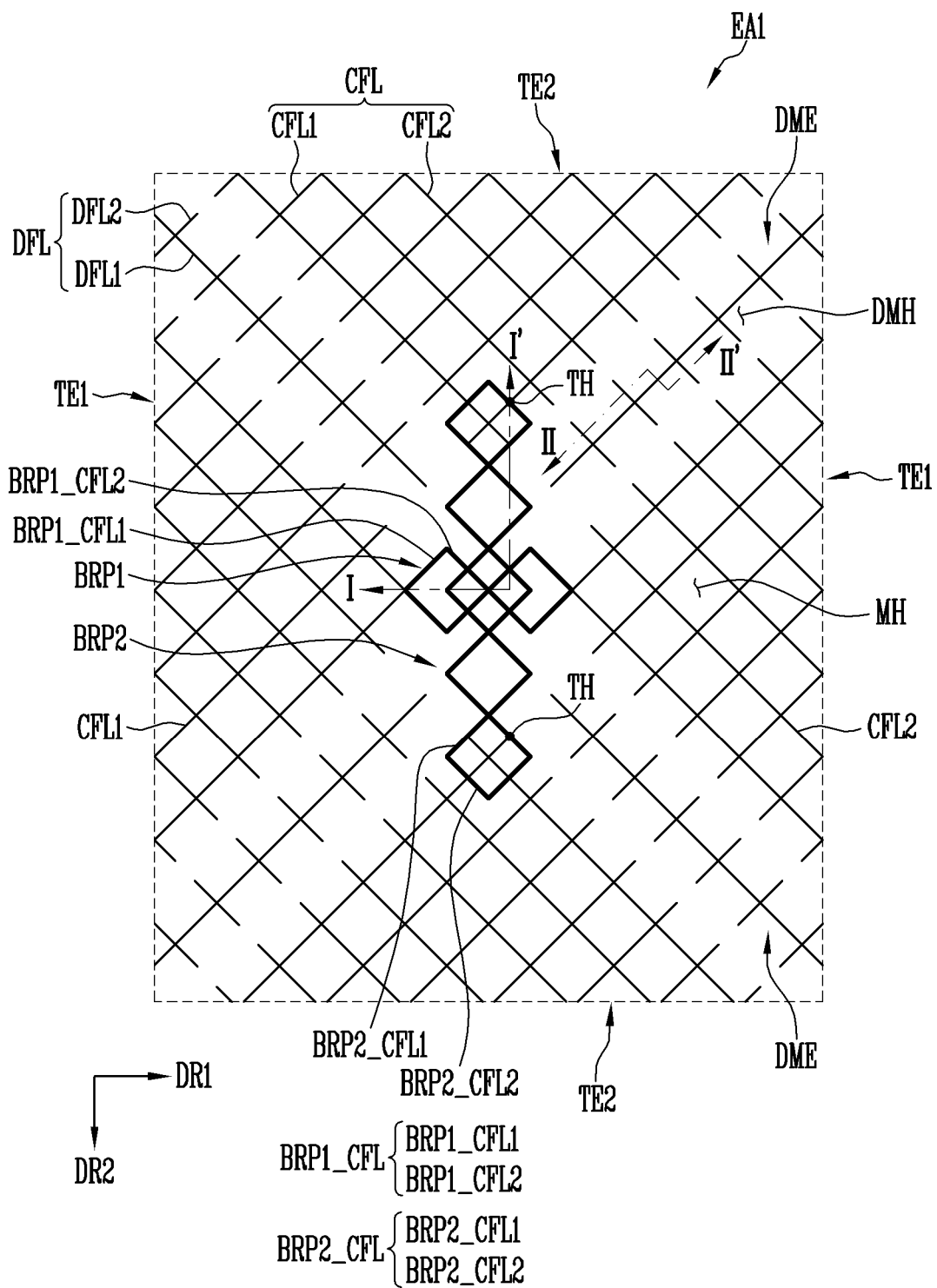
FIG. 9 is a schematic enlarged plan view of portion EA1 of FIG. 8.
Figure 10:
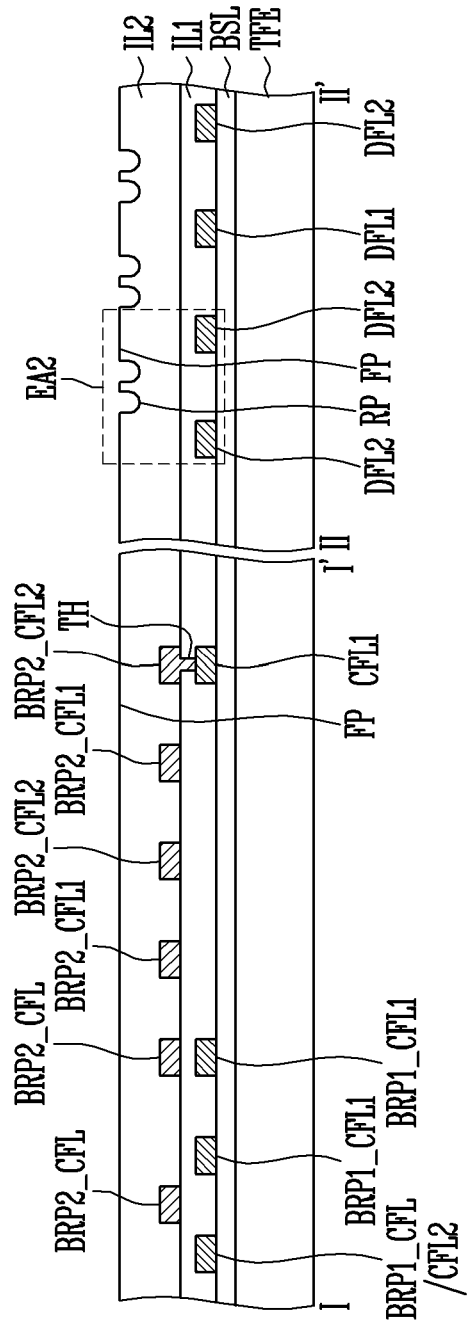
FIG. 10 is a schematic cross-sectional views taken along line I-I' and line II-II' of FIG. 9 according to an exemplary embodiment.
Figure 11A:
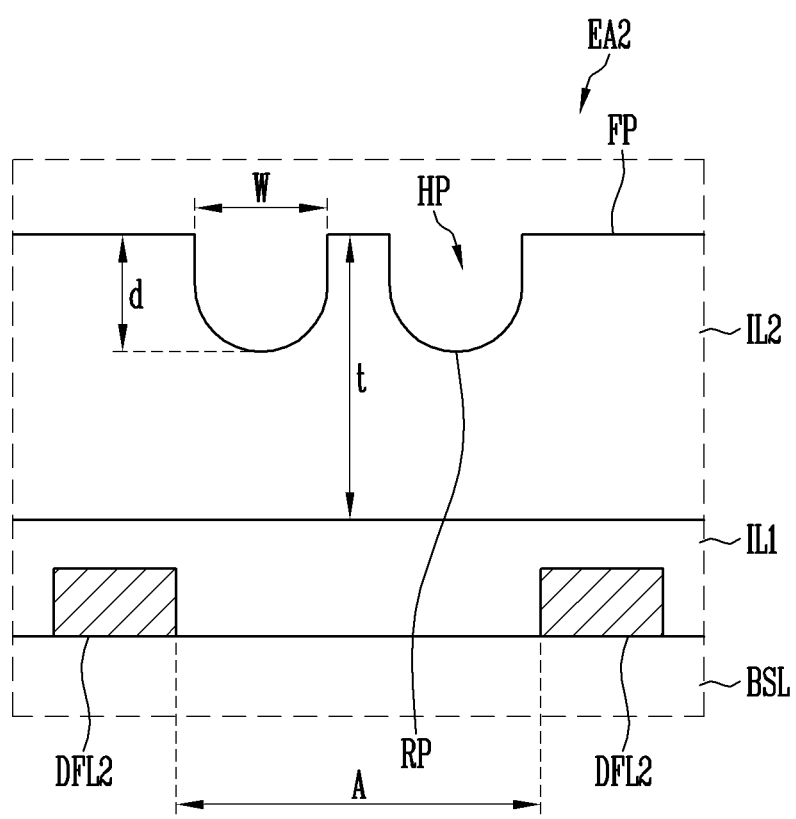
FIG. 11A is a schematic cross-sectional view of portion EA2 of FIG. 10.
Figure 11C:
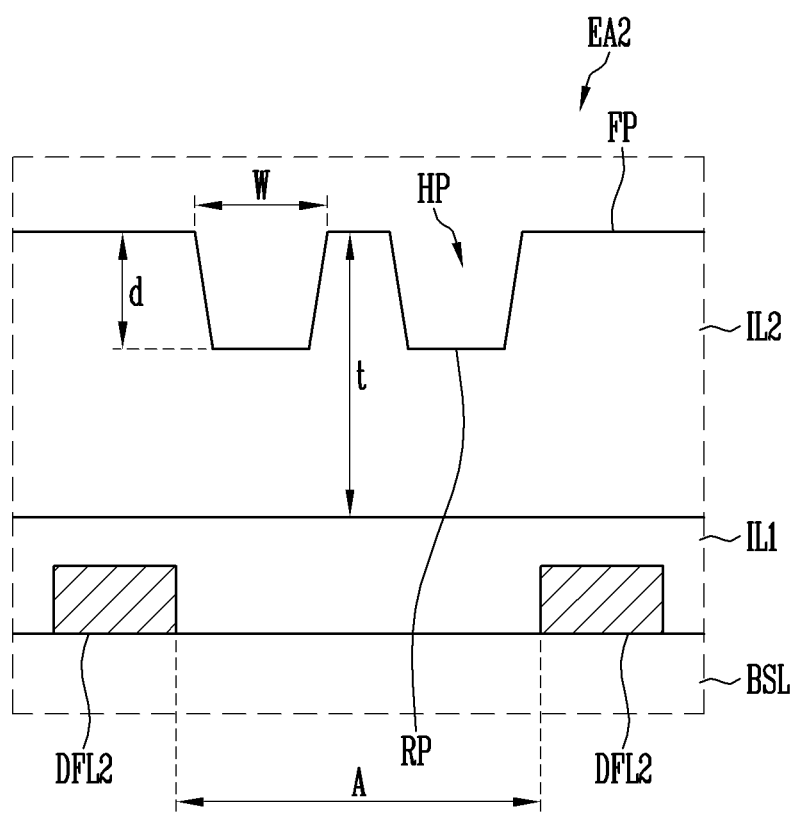

FIG. 8 is a schematic plan view of the touch sensor TS of FIG. 1 according to an exemplary embodiment. FIG. 9 is a schematic enlarged plan view of portion EA1 of FIG. 8 according to an exemplary embodiment. FIG. 10 is a schematic cross-sectional view taken along line I-I' and along line II-II' of FIG. 9 according to an exemplary embodiment. FIG. 11A is a sectional view schematically illustrating an example of portion EA2 of FIG. 10. FIGS. 11B and 11C are cross-sectional views of the second insulating layer of FIG. 11A according to exemplary embodiments.

Referring to FIGS. 1 to 10, 11A, 11B, and 11C, the touch sensor TS according to an exemplary embodiment may include a base layer BSL including a sensing area SA and a non-sensing area NSA.

The sensing area SA may overlap with the display area DA of the display panel DP and have substantially the same shape as that of the display area DA. The non-sensing area NSA may overlap with the non-display area NDA of the display panel DP.

A plurality of touch electrodes TE may be provided in the sensing area SA. A plurality of sensing lines SL coupling the touch electrodes TE to a pad unit may be provided in the non-sensing area NSA. The pad unit may include a plurality of pads SL_PD. Each of the pads SL_PD may be electrically coupled to the corresponding touch electrode TE through the corresponding sensing linen SL.

The touch electrodes TE may include a plurality of first touch electrodes TE1 extending in a first direction DR1, and a plurality of second touch electrodes TE2, which are electrically insulated from the first touch electrodes TE1 and extend in a second direction DR2 intersecting the first direction DR1. The touch electrodes TE may include a first bridge pattern BRP1 electrically and/or physically coupling adjacent first touch electrodes TE1 to each other, and a second bridge pattern BRP2 electrically and/or physically coupling adjacent second touch electrodes TE2 to each other.

Each of the first and second touch electrodes TE1 and TE2 may be electrically coupled to a corresponding one of the pads SL_PD through a corresponding one of the sensing lines SL.

The sensing lines SL may include a plurality of first sensing lines SL1 coupled to the first touch electrodes TE1, and a plurality of sensing lines SL2 coupled to the second touch electrodes TE2. In an exemplary embodiment, each of the first touch electrodes TE1 may receive a driving signal for touch sensing through the corresponding first sensing line SL1. Each of the second touch electrodes TE2 may transmit a touch sensing signal through the corresponding second sensing line SL2. However, the inventive concepts are not limited thereto. For example, each of the second touch electrodes TE2 may receive a driving signal for touch sensing through the corresponding second sensing line SL2, and each of the first touch electrodes TE1 may transmit a touch sensing signal through the corresponding first sensing line SL1.

In an exemplary embodiment, the touch sensor TS may recognize a touch of a user by sensing a change in mutual capacitance formed between the first touch electrodes TE1 and the second touch electrodes TE2, as is known in the art.

The touch sensor TS according to an exemplary embodiment may include a first conductive pattern (refer to CP1 of FIG. 7) provided on the base layer BSL, a first insulating layer IL1 provided on the first conductive pattern CP1, a second conductive pattern (refer to CP2 of FIG. 7) provided on the first insulating layer IL1, and a second insulating layer IL2 covering the second conductive pattern CP2.

The base layer BSL may be provided on the thin film encapsulation layer (refer to TFE of FIG. 7) of the display panel DP. The base layer BSL may include an organic insulating layer including organic material, or an inorganic insulating layer including inorganic material. In an exemplary embodiment, the base layer BSL may include a material having flexibility so as to be bendable or foldable, and may have a single- or multi-layer structure. The touch sensor TS may be coupled with the display panel DP to display an image and provide a touch screen function. The touch sensor TS may have transparency to allow light to pass therethrough.

In an exemplary embodiment, the base layer BSL may be an uppermost layer of the thin film encapsulation layer TFE of the display panel DP. For example, the base layer BSL may be an inorganic insulating layer (or an inorganic layer), that is the uppermost layer of the thin film encapsulation layer TFE. In some exemplary embodiments, the base layer BSL may be an additional inorganic layer (or an additional inorganic buffer layer) disposed on the thin film encapsulation layer TFE. For example, the base layer BSL may include a silicon nitride layer, a silicon oxynitride layer, a silicon oxide layer, a titanium oxide layer, or an aluminum oxide layer.

The first conductive pattern CP1 may be directly disposed on the base layer BSL. In an exemplary embodiment, the first conductive pattern CP1 may be disposed to overlap with the pixel define layer (refer to PDL of FIG. 6).

The first conductive pattern CP1 may include first touch electrodes TE1, second touch electrodes TE2, and a first bridge pattern BRP1.

The first conductive pattern CP1 may include a conductive material. The conductive material may include transparent conductive oxide or metal. Also, the first conductive pattern CP1 may include a plurality of stacked metal layers. Examples of the conductive oxide may include indium tin oxide (ITO), indium zinc oxide (IZO), antimony zinc oxide (AZO), indium tin zinc oxide (ITZO), zinc oxide (ZnO), and tin oxide ($SnO_2$). Examples of the metal may include copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, and lead. The first conductive pattern CP1 may have a single- or multi-layer structure.

The first insulating layer IL1 may be disposed on the first conductive pattern CP1. The first insulating layer IL1 may include the same material as that of the base layer BSL, but the inventive concepts are not limited thereto. In an exemplary embodiment, the first insulating layer IL1 may include an organic insulating layer including organic material, or an inorganic insulating layer including inorganic material.

The second conductive pattern CP2 may include a single conductive material layer or a plurality of stacked conductive material layers, in substantially the same manner as that of the first conductive pattern CP1. The second conductive pattern CP2 may include a second bridge pattern BRP2 provided on the first insulating layer IL1.

The second insulating layer IL2 may be disposed on the first insulating layer IL1 on which the second conductive pattern CP2 is disposed. The second insulating layer IL2 may prevent the second conductive pattern CP2 from being exposed to the outside, thus preventing the second conductive pattern CP2 from being corroded. The second insulating layer IL2 may be formed of an organic insulating layer including an organic material. The organic material may include one of acryl, polyimide (PI), polyamide (PA), and benzocyclobutene (BCB). The second insulating layer IL2 formed of an organic insulating layer may be transparent and flexible, and mitigate unevenness of a lower structure provided under the second insulating layer IL2 and planarize an upper surface of the lower structure.

The first bridge pattern BRP1 and the first and second touch electrodes TE1 and TE2 have been described as being included in the first conductive pattern CP1, and the second bridge pattern BRP2 has been described as being included in the second conductive pattern CP2 according to an exemplary embodiment. However, the inventive concepts are not limited thereto. In some exemplary embodiments, the second bridge pattern BRP2 may be included in the first conductive pattern CP1, and the first bridge pattern BRP1 and the first and second touch electrodes TE1 and TE2 may be included in the second conductive pattern CP2. In other words, the second bridge pattern BRP2 may be formed and/or disposed on the base layer BSL, and the first bridge pattern BRP1 and the first and second touch electrodes TE1 and TE2 may be formed and/or disposed on the first insulating layer IL1.

Furthermore, the first conductive pattern CP1 has been described as being disposed on the base layer BSL, and the second conductive pattern CP2 has been described as being disposed on the first insulating layer IL1 according to an exemplary embodiment. However, the inventive concepts are not limited thereto. In some exemplary embodiments, the first conductive pattern CP1 may be disposed on the first insulating layer IL1, and the second conductive pattern CP2 may be disposed on the base layer BSL.

In addition, the first and second touch electrodes TE1 and TE2 have been described as being provided on the same layer, but the inventive concepts are not limited thereto. In some exemplary embodiments, the first touch electrodes TE1 and the second touch electrodes TE2 may be provided on different layers.

In an exemplary embodiment, each of the first and second touch electrodes TE1 and TE2 may include a plurality of conductive fine lines CFL. For example, each of the first and second touch electrodes TE1 and TE2 may include a plurality of first conductive fine lines CFL1, which extend substantially in an oblique direction with respect to the first direction DR1 and are substantially parallel to each other, and a plurality of second conductive fine lines CFL2 which substantially extend in an oblique direction with respect to the second direction DR2 and are substantially parallel to each other. Due to the first conductive fine lines CFL1 and the second conductive fine lines CFL2, each of the first and second touch electrodes TE1 and TE2 may have a mesh structure. The mesh structure may include a plurality of mesh openings MH, e.g., regions formed by intersecting the first and second conductive fine lines CFL1 and CFL2 with each other.

When each of the first and second touch electrodes TE1 and TE2 has a mesh structure, the surface area of an overlapping portion of each of the first and second touch electrodes TE1 and TE2 may be reduced by the mesh openings MH. In this manner, the parasitic capacitance of the first and second touch electrodes TE1 and TE2 with the electrodes of the display panel DP may be reduced.

In an exemplary embodiment, each of the first bridge patterns BRP1 may include a plurality of first-bridge-pattern-related conductive fine lines BRP1_CFL. Each of the second bridge patterns BRP2 may include a plurality of second-bridge-pattern-related conductive fine lines BRP2_CFL.

For example, the first-bridge-pattern-related conductive fine lines BRP1_CFL may include a plurality of first-bridge-pattern-related first conductive fine lines BRP1_CFL1, which extend substantially in an oblique direction with respect to the first direction DR1 and are substantially parallel to each other, and a plurality of first-bridge-pattern-related second conductive fine lines BRP1_CFL2, which substantially extend in an oblique direction with respect to the second direction DR2 and are substantially parallel to each other. Due to the first-bridge-pattern-related first conductive fine lines BRP1_CFL1 and the first-bridge-pattern-related second conductive fine lines BRP1_CFL2, each of the first bridge patterns BRP1 may have a mesh structure, which may include a plurality of mesh openings MH, e.g., regions formed by intersecting the first-bridge-pattern-related first conductive fine lines BRP1_CFL1 and the first-bridge-pattern-related second conductive fine lines BRP1_CFL2 with each other.

Furthermore, the second-bridge-pattern-related conductive fine lines BRP2_CFL may include a plurality of second-bridge-pattern-related first conductive fine lines BRP2_CFL1, which extend substantially in an oblique direction with respect to the first direction DR1 and are substantially parallel to each other, and a plurality of second-bridge-pattern-related second conductive fine lines BRP2_CFL2, which substantially extend in an oblique direction with respect to the second direction DR2 and are substantially parallel to each other. Due to the second-bridge-pattern-related first conductive fine lines BRP2_CFL1 and the second-bridge-pattern-related second conductive fine lines BRP2_CFL2, each of the second bridge patterns BRP2 may have a mesh structure, which may include a plurality of mesh openings MH, e.g., regions formed by intersecting the second-bridge-pattern-related first conductive fine lines BRP2_CFL1 and the second-bridge-pattern-related second conductive fine lines BRP2_CFL2 with each other.

The second-bridge-pattern-related first and second conductive fine lines BRP2_CFL1 and BRP2_CFL2 may be provided on the first insulating layer IL1 and be electrically and/or physically coupled to the conductive fine lines CFL of the second touch electrodes TE2 through a through hole TH passing through the first insulating layer IL1. In this manner, second touch electrodes TE2 that are disposed adjacent to each other along the second direction DR2 may be coupled to each other.

The touch sensor TS may further include a plurality of dummy electrodes DME disposed between the first and second touch electrodes TE1 and TE2 in the sensing area SA on the base layer BSL. In an exemplary embodiment, the dummy electrodes DME may be disposed on the base layer BSL, but the inventive concepts are not limited thereto. In some exemplary embodiments, the dummy electrodes DME may be disposed on the first insulating layer IL1.

Each of the dummy electrodes DME may include a plurality of dummy fine lines DFL. For example, each dummy electrode DME may include a first dummy fine line DFL1 which extends substantially in an oblique direction with respect to the first direction DR1, and second dummy fine lines DFL2 which extends substantially in an oblique direction with respect to the second direction DR2 and are substantially parallel to each other. Each of the dummy electrodes DME may have a mesh structure including the dummy fine lines DFL, which may include a plurality of dummy mesh openings DMH, e.g., areas formed by intersecting the first and second dummy fine lines DFL1 and DFL2 with each other.

When each of the dummy electrodes DME has a mesh structure, the surface area of an overlapping portion between the dummy electrodes DME may be reduced by the dummy mesh openings DMH. As such, the parasitic capacitance of the dummy electrodes DME with the electrodes of the display panel DP may be reduced.

The dummy electrodes DME may be formed through substantially the same process as that for forming the first and second touch electrodes TE1 and TE2. As such, in some exemplary embodiments, the dummy electrodes DME may include substantially the same material and substantially the same stacked structure as those of the first and second touch electrodes TE1 and TE2.

In an exemplary embodiment, the dummy electrodes DME are floating electrodes and are not electrically coupled with the first touch electrodes TE1 and the second touch electrodes TE2. The dummy electrodes DME may reduce the visibility of a boundary area between the first touch electrodes TE1 and the second touch electrodes TE2.

The first insulating layer IL1 may be disposed on the dummy electrodes DME, and the second insulating layer IL2 may be disposed on the first insulating layer IL1.

The second insulating layer IL2 may be divided into a planar part FP and a depressed part HP. The depressed part HP may be provided to correspond to an area between the dummy electrodes DME. The planar part FP may be provided in areas, other than the depressed part HP, e.g., in areas corresponding to the dummy electrodes DME, the first and second touch electrodes TE1 and TE2, and the first and second bridge patterns BRP1 and BRP2.

The planar part FP of the second insulating layer IL2 may function as a planarization layer for mitigating a step difference formed by the touch electrodes TE, the first and second bridge patterns BRP1 and BRP2, and the dummy electrodes DME.

The depressed part HP of the second insulating layer IL2 may include at least one discontinuous pattern, such as uneven pattern RP corresponding to the area defined between the dummy electrodes DME. As used herein, "discontinuous pattern" encompasses all types of surface modifications, whether formed by the same or different shaped discontinuities in a surface, and whether the discontinuities repeat at regular or irregular intervals. In an exemplary embodiment, as illustrated in FIG. 11A, the uneven pattern RP may correspond to an area A defined between two second dummy fine lines DFL2 spaced apart from each other by a predetermined distance. The uneven pattern RP may be recessed from a first surface (e.g., an upper surface) of the second insulating layer IL2 toward a second surface (e.g., a lower surface) of the second insulating layer IL2 that faces the two second dummy fine lines DFL2.

The uneven pattern RP may have a predetermined width and height, but the inventive concepts are not limited thereto. For example, the uneven pattern RP may have a random shape. In an exemplary embodiment, the uneven pattern RP may be formed and/or provided through an etching process using a mask after an insulating material layer has been applied to a front surface of the base layer BSL including the second bridge pattern BRP2.

As illustrated in FIG. 11A, the uneven pattern RP may have a substantially semi-elliptical shape including a reversed Gaussian shape, but the inventive concepts are not limited to a particular shape of the uneven pattern RP. For example, as shown in FIG. 11B, the uneven pattern RP may have a substantially rectangular shape, which is recessed with a constant width from the first surface of the second insulating layer IL2 toward the second surface thereof. Alternatively, as shown in FIG. 11C, the uneven pattern RP may have a substantially polygonal shape, which has a decreasing width from the first surface of the second insulating layer IL2 toward the second surface thereof. As a further alternative, the uneven pattern RP may have a substantially polygonal shape, which has an increasing width from the first surface of the second insulating layer IL2 toward the second surface thereof.

As described above, the inventive concepts are not limited to a particular shape of the uneven pattern RP, and the uneven pattern RP may have various shapes including a circular shape, a conical shape, etc. in some exemplary embodiments.

The uneven pattern RP may have a width W ranging from 0 μm to 5 μm, but the inventive concepts are not limited thereto. In some exemplary embodiments, the width W of the uneven pattern RP may be equal to or less than the distance of the area A between two second dummy fine lines DFL2 disposed adjacent to each other. Furthermore, the uneven pattern RP may have a depth "d" ranging from 0 μm to 5 μm, but the inventive concepts are not limited thereto. More particularly, in an exemplary embodiment, the uneven pattern RP may be recessed from the first surface of the second insulating layer IL2 toward the second surface thereof to have a depth "d" that corresponds to about a half of the thickness "t" of the second insulating layer IL2, in consideration of the reliability of the second insulating layer IL2.

The second insulating layer IL2 may be formed to have at least a predetermined thickness to form the uneven pattern RP therein. For example, the second insulating layer IL2 may have a thickness "t" ranging from about 4.0 μm to about 5.0 μm, but the inventive concepts are not limited thereto. For example, the second insulating layer IL2 may have at least a predetermined thickness to a degree that may not unnecessarily increase the thickness (or the weight) of the touch sensor TS.

As described above, as the second insulating layer IL2 includes the uneven pattern RP, the second insulating layer IL2 may have an irregular rough surface, e.g., an uneven surface, in an area corresponding to the area A defined between the second dummy fine lines DFL2. In this case, external light incident on the touch sensor TS, particularly in the area A defined between the two second dummy fine lines DFL2 spaced apart from each other by a predetermined distance, may be reflected from edges (or side surfaces) of the second dummy fine lines DFL2 toward the uneven pattern RP and be irregularly reflected by the uneven pattern RP.

Each of the edges (or the side surfaces) of the second dummy fine lines DFL2 are illustrated as having an inclination angle of 90° in a vertical direction with respect to the base layer BSL, the inventive concepts are not limited thereto. For example, at least some of the second dummy fine lines DFL2 may have tapered edges (or tapered side surfaces).

The irregular reflection of external light generated in the area A defined between the second dummy fine lines DFL2 may be removed by destructive interference with external light reflection generated on the touch electrodes TE. Hence, in the display device DD according to an exemplary embodiment, the reflectivity of external light may be reduced and the dummy electrodes DME may not be visible from the outside, and thus, increasing the reliability of the display device DD.

In particular, external light incident on the touch sensor TS may be reflected by the touch electrodes TE, the first and second bridge patterns BRP1 and BRP2, etc. that are disposed in the sensing area SA. The external light reflected by the components, such as the touch electrodes TE, and the first and second bridge patterns BRP1 and BRP2 may travel in a direction that is invisible to the eyes of the user, because the reflection of the external light on the components is specular reflection (or regular reflection, in which incident light is reflected at the same angle to the surface normal as the incident light).

Furthermore, if external light is incident on the area A defined between the two second dummy fine lines DFL2 spaced apart from each other by a predetermined distance, the external light may be reflected in substantially the same direction as the incident angle by the edges of the second dummy fine lines DFL2 and travel toward the uneven pattern RP of the second insulating layer IL2. In this case, the external light may be irregularly reflected by the uneven pattern RP of the second insulating layer IL2 and travel in directions that are invisible to the eyes of the user, or the irregular reflection of the external light may be removed by destructive interference with external light reflected by the touch electrodes TE and the first and second bridge patterns BRP1 and BRP2.

As such, in the display device DD according to exemplary embodiments of the invention, the reflectivity of external light may be reduced and the probability of the dummy electrodes DME from being seen to the user e may be substantially reduced, thereby improving the reliability of the display device DD.

In addition, as described above, since the second insulating layer IL2 including the uneven pattern RP has at least a predetermined thickness "t", the components disposed thereunder, such as the touch electrodes TE, the first and second bridge patterns BRP1 and BRP2, and the dummy electrodes DME may be prevented from being affected by external impact or the like.

Furthermore, the second insulating layer IL2 including the uneven pattern RP may minimize a flexural failure in the touch sensor TS that may occur when the touch sensor TS is folded to apply stress thereto, and thus, enhancing the impact resistance characteristics of the touch sensor TS.

In some exemplary embodiments, a polarizing film may be provided on the touch sensor TS. The polarizing film may have a polarization axis and linearly polarize light in a direction perpendicular to the polarization axis. For example, the polarizing film may absorb rays of light that are aligned with the polarization axis, and allow rays of light that are perpendicular to the polarization axis to pass therethrough. In this manner, when light passes through the polarizing film, light may be linearly polarized in a direction perpendicular to the polarization axis. The window WD may be attached to the polarizing film by an adhesive or the like.

Figure 13:
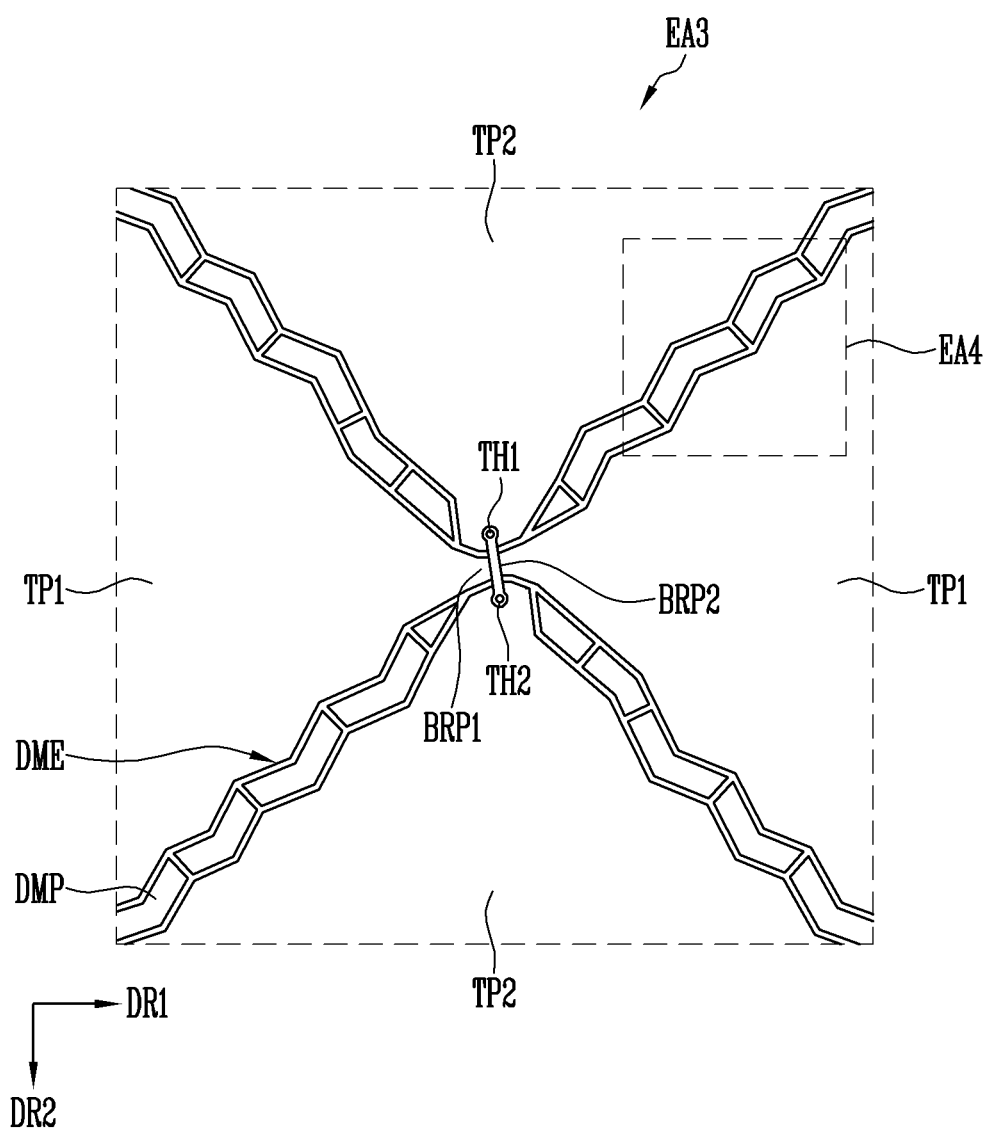
FIG. 13 is a schematic enlarged plan view of portion EA3 of FIG. 12.
Figure 14:
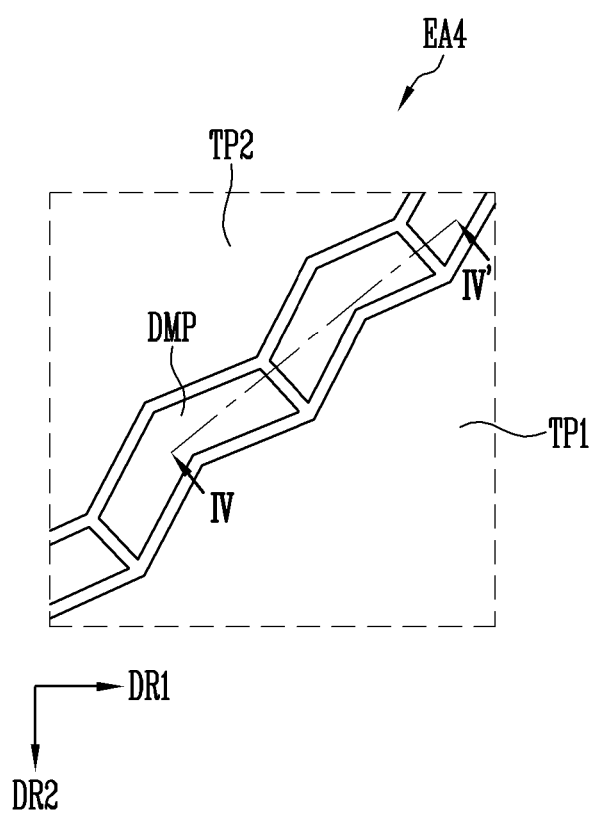
FIG. 14 is a schematic enlarged plan view of portion EA4 of FIG. 13.
Figure 15:
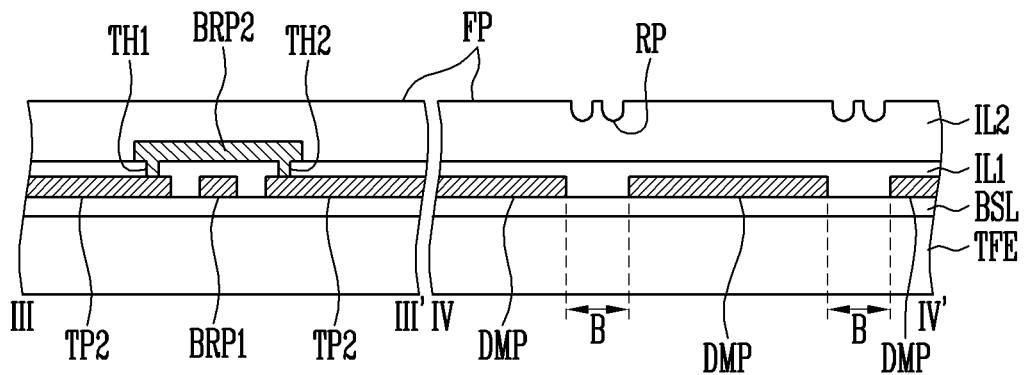
FIG. 15 is a schematic cross-sectional view taken along line III-III' and line IV-IV' of FIG. 14 according to an exemplary embodiment.

FIG. 12 is a schematic plan view of the touch sensor TS of FIG. 1. FIG. 13 is a schematic enlarged plan view of portion EA3 of FIG. 12 according to an exemplary embodiment. FIG. 14 is a schematic enlarged plan view of EA4 of FIG. 13 according to an exemplary embodiment. FIG. 15 is a schematic cross-sectional view taken along line III-III' and line IV-IV' of FIG. 14.

In FIG. 12, like reference numerals will be used to designate substantially the same components as those described with reference to FIG. 8, and thus, repeated descriptions thereof will be omitted to avoid redundancy. Furthermore, the configuration of the touch sensor of FIG. 12, other than the shape of each touch electrode and the shape of each dummy electrode, may be equal or similar to that of the touch sensor of FIG. 8.

Referring to FIGS. 1 and 12 to 15, the touch sensor TS according to an exemplary embodiment may include a base layer BSL including a sensing area SA and a non-sensing area NSA.

A plurality of touch electrodes TE may be provided in the sensing area SA. A plurality of sensing lines SL configured to couple the touch electrodes TE to a pad unit may be provided in the non-sensing area NSA. The pad part may include a plurality of pads SL_PD. Each of the pads SL_PD may be electrically coupled to the corresponding touch electrode TE through the corresponding sensing line SL.

The touch electrodes TE may include a plurality of first touch electrodes TE1 extending substantially in a first direction DR1, and a plurality of second touch electrodes TE2 which are electrically insulated from the first touch electrodes TE1 and extend substantially in a second direction DR2. The touch electrodes TE may include conductive material. For example, the touch electrodes TE may be formed of transparent conductive oxide, such as indium tin oxide (ITO), indium zinc oxide (IZO), or indium gallium zinc oxide (IGZO). However, the inventive concepts are not limited thereto, and the touch electrodes TE may be formed of metal, conductive polymers, etc. Alternatively, the touch electrodes TE may be formed of nanowires including Ag, Cu, Au, etc.

In an exemplary embodiment, the first touch electrodes TE1 may include first touch patterns TP1 and first bridge patterns BRP1.

The first touch patterns TP1 may be spaced apart from each other in the first direction DR1. Each of the first touch patterns TP1 may have a substantially rhombohedral shape. However, the inventive concepts are not limited thereto a particular shape of the first touch patterns TP1, and the first touch pattern TP1 may have various shapes. Each of boundaries of the first touch patterns TP1 may have a zigzag shape. However, the inventive concepts are not limited thereto a particular shape of the boundaries of the first touch patterns TP1, and the boundary may have various shapes. When each boundary of the first touch patterns TP1 has a zigzag shape, even when the first touch patterns TP1 may be disposed to overlap with the display area of the display panel DP (refer to DA of FIG. 3), effects of the first touch patterns TP1 on the visibility of an image to be displayed may be reduced.

Each of the first bridge patterns BRP1 may couple two first touch patterns TP1 that are adjacent to each other in the first direction DR1. The first bridge patterns BRP1 may extend substantially in the first direction DR1. As illustrated in FIG. 13, the direction in which the first touch patterns TP1 extend may be substantially the same as the direction in which the first bridge patterns BRP1 extend. The first touch patterns TP1 and the first bridge patterns BRP1 may be integrally formed and/or provided. When the first touch patterns TP1 and the first bridge patterns BRP1 are integrally formed and/or provided, the first bridge patterns BRP1 may be regarded as portions of the first touch patterns TP1. However, the inventive concepts are not limited thereto. For example, in some exemplary embodiments, the first touch patterns TP1 and the first bridge patterns BRP1 may be individually formed, and electrically and/or physically coupled to each other through a contact hole or a via hole.

In an exemplary embodiment, the second touch electrodes TE2 may include second touch patterns TP2 and second bridge patterns BRP2.

The second touch patterns TP2 may be spaced apart from each other in the second direction DR2 intersecting the first direction DR1. Each of the second touch patterns TP2 may have a substantially rhombohedral shape. However, the inventive concepts are not limited thereto, and the second touch pattern TP2 may have various shapes. Each of boundaries of the second touch patterns TP2 may have a zigzag shape. However, the inventive concepts are not limited thereto, and the boundary may have various shapes.

Each of the second bridge patterns BRP2 may couple two second touch patterns TP2 that are adjacent to each other in the second direction DR2. The second bridge patterns BRP2 may substantially extend in the second direction DR2. As illustrated in FIG. 13, the direction in which the second touch patterns TP2 extend may be substantially the same as the direction in which the second bridge patterns BRP2 extend.

Each of the second bridge patterns BRP2 may electrically and/or physically couple one second touch pattern TP2 of the second touch patterns TP2 extending substantially in the second direction DR2 with another second touch pattern TP2 adjacent to the one second touch pattern TP2 through first and second through holes TH1 and TH2. As illustrated in FIG. 15, the first through hole TH1 may pass through the first insulating layer IL1 and expose a portion of one corresponding second touch pattern TP2. The second through hole TH2 may pass through the first insulating layer IL1 and expose a portion of another corresponding second touch pattern TP2.

In an exemplary embodiment, the first bridge patterns BRP1, the first touch patterns TP1, and the second touch patterns TP2 may be disposed on the same layer. The second bridge patterns BRP2 may be disposed on a layer different from the layer on which the first bridge patterns BRP1, the first touch patterns TP1, and the second touch patterns TP2 are disposed.

In particular, the first bridge patterns BRP1, the first touch patterns TP1, and the second touch patterns TP2 may be disposed on the base layer BSL. The second bridge patterns BRP2 may be disposed on the first insulating layer IL1. The second insulating layer IL2 may be formed and/or disposed on the second bridge patterns BRP2. In an exemplary embodiment, the first bridge patterns BRP1 and the second bridge patterns BRP2 may be electrically and/or physically insulated from each other with the first insulating layer IL1 interposed therebetween.

The first bridge patterns BRP1, and the first and second touch patterns TP1 and TP2 have been described as being disposed on the base layer BSL, and the second bridge patterns BRP2 have been described as being disposed on the first insulating layer IL1 according to an exemplary embodiment. However, the inventive concepts are not limited thereto. In some exemplary embodiments, the second bridge patterns BRP2 may be formed and/or disposed on the base layer BSL, and the first bridge patterns BRP1 and the first and second touch patterns TP1 and TP2 may be formed and/or disposed on the first insulating layer IL1.

The touch sensor TS may further include a plurality of dummy electrodes DME disposed between the first and second touch patterns TP1 and TP2 in the sensing area SA on the base layer BSL. The dummy electrodes DME may be disposed on the base layer BSL, but the inventive concepts are not limited thereto. In some exemplary embodiments, the dummy electrodes DME may be disposed on the first insulating layer IL1.

Each of the dummy electrodes DME may include a plurality of dummy patterns DMP. The dummy patterns DMP may be disposed on the same layer as the first touch patterns TP1 and the second touch patterns TP2. The dummy patterns DMP may be electrically floated. The dummy patterns DMP may be provided to prevent the first touch patterns TP1 and the second touch patterns TP2 from being visible to the user.

In an exemplary embodiment, each of the dummy patterns DMP may be disposed in the sensing area SA at a position spaced apart from an adjacent dummy pattern DMP by a predetermined distance, and may be electrically and/or physically separated from the adjacent dummy pattern DMP. The dummy patterns DMP may be formed through substantially the same process as that of the first and second touch patterns TP1 and TP2, and thus may include substantially the same material and the same stacked structure as those of the first and second touch patterns TP1 and TP2. In some exemplary embodiments, each of the dummy patterns DMP may have a mesh structure including a plurality of conductive dummy fine lines.

As shown in FIG. 15, the first insulating layer IL1 may be disposed on the dummy patterns DMP, and the second insulating layer IL2 may be disposed on the first insulating layer IL1.

The first insulating layer IL1 may be disposed on the dummy pattern DMP. The first insulating layer IL1 may include substantially the same material as that of the base layer BSL, but the inventive concepts are not limited thereto. In some exemplary embodiments, the first insulating layer IL1 may include an organic insulating layer including organic material, or an inorganic insulating layer including inorganic material.

The second insulating layer IL2 may be formed and/or disposed on the second bridge patterns BRP2 on the first insulating layer IL1. The second insulating layer IL2 may prevent the second bridge patterns BRP2 from being exposed to the outside, thus preventing the second bridge patterns BRP2 from being corroded. The second insulating layer IL2 may include an organic insulating layer made of organic material. The organic material may include one of acryl, polyimide (PI), polyamide (PA), and benzocyclobutene (BCB). The second insulating layer IL2 may include an organic insulating layer that may be transparent and flexible, which can mitigate unevenness of a lower structure provided under the second insulating layer IL2 and planarize an upper surface of the lower structure.

In some exemplary embodiments, when the second bridge patterns BRP2 are disposed on the base layer BSL, and the first bridge pattern BRP1 and the first and second touch patterns TP1 and TP2 are disposed on the first insulating layer IL1, the second insulating layer IL2 may be formed and/or provided on the first bridge pattern BRP1 and the first and second touch patterns TP1 and TP2.

In an exemplary embodiment, the second insulating layer IL2 may be divided into a planar part FP and a depressed part HP. The depressed part HP may be provided to correspond to an area defined between the dummy patterns DMP. The planar part FP may be provided in remaining areas, such as areas corresponding to the dummy patterns DMP, the first and second touch patterns TP1 and TP2, and the first and second bridge patterns BRP1 and BRP2.

The planar part FP of the second insulating layer IL2 may function as a planarization layer for mitigating a step difference formed by the first and second touch patterns TP1 and TP2, the first and second bridge patterns BRP1 and BRP2, and the dummy patterns DMP.

The depressed part HP of the second insulating layer IL2 may include at least one uneven pattern RP corresponding to the area defined between the dummy patterns DMP. In an exemplary embodiment, as illustrated in FIG. 15, the uneven pattern RP may correspond to an area B defined between two second dummy patterns DMP spaced apart from each other by a predetermined distance. The uneven pattern RP may have be recessed from an upper surface of the second insulating layer IL2 toward a lower surface of the second insulating layer IL2 that faces the dummy patterns DMP.

The uneven pattern RP may have a predetermined width and height, and have various shapes, such as a substantially semi-elliptical shape, a circular shape, a polygonal shape, a conical shape, etc.

As described above, as the second insulating layer IL2 includes the uneven pattern RP, the second insulating layer IL2 may have an irregular rough surface, e.g., an uneven surface, in an area corresponding to the area B defined between the second dummy patterns DMP. In this manner, external light incident on the touch sensor TS, more particularly, in the area B defined between the two second dummy patterns DMP spaced apart from each other by the predetermined distance, may be irregularly reflected by the uneven pattern RP.

The irregular reflection of external light generated in the area B, which is defined between the second dummy patterns DMP spaced apart from each other by the predetermined distance, may be removed by destructive interference with external light reflection generated on the touch electrodes TE. Hence, in the display device DD in accordance with an exemplary embodiment, the reflectivity of external light may be reduced to significantly reduce the probability of the dummy patterns DMP being visible to the outside, thereby improving the reliability of the display device DD.

According to the principles and exemplary embodiments of the invention a touch sensor and a display device including the same have an insulating layer including at least one uneven pattern formed in an area defined between dummy patterns, to improve the reliability of the touch sensor.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A touch sensor comprising:
a base layer including a sensing area and a non-sensing area;
a plurality of touch electrodes disposed in the sensing area;
a dummy electrode disposed between the touch electrodes, the dummy electrode comprising a plurality of dummy patterns spaced apart from each other; and
an insulating layer disposed on the touch electrodes and the dummy electrode,
wherein the insulating layer includes at least one discontinuous pattern in an area disposed between adjacent dummy patterns, and
wherein the discontinuous pattern comprises an uneven pattern recessed from one surface of the insulating layer toward the base layer on which the dummy patterns are disposed.

2. The touch sensor according to claim 1, wherein the uneven pattern extends to about half of a thickness of the insulating layer or less from the first surface of the insulating layer.

3. The touch sensor according to claim 2, wherein a width of the uneven pattern is about equal to or less than a distance between the adjacent dummy patterns.

4. The touch sensor according to claim 3, wherein:
the dummy electrode is disposed on a planar surface; and the uneven pattern is configured to irregularly reflect light incident on a first area between the adjacent dummy patterns.

5. The touch sensor according to claim 1, wherein the insulating layer is substantially flat in areas other than the area including the uneven pattern.

6. The touch sensor according to claim 1, wherein the touch electrodes comprise:
   a first touch electrode including first touch patterns and first bridge patterns coupling the first touch patterns to each other; and
   a second touch electrode including second touch patterns and second bridge patterns coupling the second touch patterns to each other.

7. The touch sensor according to claim 6, wherein:
   the first touch patterns and the second touch patterns are disposed on the same layer, and any one of the first bridge patterns and the second bridge patterns are disposed on the same layer as the first touch patterns; and
   the first bridge patterns and the second bridge patterns intersect with each other with an interlayer insulating layer interposed therebetween.

8. The touch sensor according to claim 7, wherein the interlayer insulating layer comprises an organic insulating layer including organic material.

9. The touch sensor according to claim 7, wherein the dummy electrode is disposed on the same layer as the first and second touch patterns.

10. The touch sensor according to claim 9, wherein each of the touch electrodes and the dummy electrode has a substantially mesh shape.

11. The touch sensor according to claim 10, wherein the dummy electrode comprises:
    a first dummy fine line extending substantially in a first direction;
    a plurality of second dummy fine lines extending substantially in a second direction intersecting the first direction, the second dummy fine lines being substantially parallel to each other; and
    a plurality of dummy mesh openings formed at intersections between the first dummy fine line and the second dummy fine lines.

12. A touch sensor comprising:
    a base layer including a sensing area and a non-sensing area;
    a first touch electrode disposed in the sensing area and substantially extending in a first direction;
    a second touch electrode including touch patterns spaced apart from each other along a second direction intersecting the first direction and a bridge pattern coupling adjacent touch patterns in the second direction;
    a first insulating layer interposed between the bridge pattern and the touch patterns;
    a dummy electrode disposed between the first touch electrode and the touch patterns, the dummy electrode including a plurality of dummy patterns spaced apart from each other; and
    a second insulating layer disposed on the first touch electrode, the second touch electrode, and the dummy electrode,
    wherein the second insulating layer includes at least one discontinuous pattern in an area disposed between adjacent dummy patterns, and
    wherein the discontinuous pattern comprises an uneven pattern recessed from one surface of the second insulating layer toward the base layer on which the dummy patterns are disposed.

13. The touch sensor according to claim 12, wherein:
    the dummy electrode is disposed on a planar surface; and
    the uneven pattern is configured to irregularly reflect light incident on an area between the adjacent dummy patterns.

14. The touch sensor according to claim 13, wherein the dummy electrode includes conductive fine lines intersecting each other and has a substantially mesh shape.

15. A display device comprising:
    a display panel configured to display an image; and
    a touch sensor disposed on the display panel, and comprising:
      a base layer disposed on the display panel, and including a sensing area and a non-sensing area;
      a plurality of touch electrodes disposed in the sensing area;
      a dummy electrode disposed between the touch electrodes and including a plurality of dummy patterns spaced apart from each other; and
      an insulating layer disposed on the touch electrodes and the dummy electrode, and including at least one discontinuous pattern in an area disposed between adjacent dummy patterns,
    wherein the discontinuous pattern comprises an uneven pattern recessed from one surface of the insulating layer toward the base layer on which the dummy patterns are disposed.

16. The display device according to claim 15, wherein a plurality of discontinuous patterns are formed in the area between the adjacent dummy patterns.

17. The display device according to claim 15, wherein the discontinuous patterns does not overlap the dummy patterns.

18. The display device according to claim 15, wherein:
    the dummy electrode is disposed on a planar surface; and
    the uneven pattern is configured to irregularly reflect light incident on an area between the adjacent dummy patterns to cause destructive interference with light reflected by the touch electrodes.

19. The display device according to claim 15, wherein the dummy electrode has a substantially a mesh shape and is electrically floated.

20. The display device according to claim 15, wherein the dummy electrode is disposed on the same layer as the touch electrodes.

21. The display device according to claim 15, wherein the touch electrodes and the dummy electrode each have a mesh shape.

22. The display device according to claim 15, wherein the dummy electrode comprises:
    a first dummy fine line extending substantially in a first direction;
    a plurality of second dummy fine lines extending substantially in a second direction intersecting the first direction, the plurality of second dummy fine lines being generally parallel to each other; and
    a plurality of dummy mesh openings formed by intersecting the first dummy fine line and the second dummy fine lines with each other.

23. The display device according to claim 15, wherein the display panel comprises:
    a substrate including a display area to display the image, and a non-display area provided on at least one side of the display area;

a pixel circuit layer disposed on the substrate, and comprising at least one transistor;
a display element layer disposed on the pixel circuit layer, and comprising at least one light emitting element to emit light; and
an encapsulation layer disposed on the display element layer.

* * * * *